United States Patent
Shoji et al.

(10) Patent No.: US 6,564,254 B1
(45) Date of Patent: May 13, 2003

(54) SYSTEM AND A PROCESS FOR SPECIFYING A LOCATION ON A NETWORK

(75) Inventors: Wataru Shoji, Tokyo (JP); Daisuke Tabuchi, Tokyo (JP); Ichiro Nakajima, Tokyo (JP); Gabriele Gramlich, Leverkusen (DE)

(73) Assignee: Dream Technologies Corporation, Tokyo (JP)

( * ) Notice: Subject to any disclaimer, the term of this patent is extended or adjusted under 35 U.S.C. 154(b) by 0 days.

(21) Appl. No.: 09/412,446

(22) Filed: Oct. 4, 1999

(30) Foreign Application Priority Data

Nov. 4, 1998 (JP) .......................... 10-313070
Nov. 30, 1998 (JP) .......................... 10-340326
Dec. 15, 1998 (JP) .......................... 10-356267

(51) Int. Cl.⁷ .................................. G06I 9/00
(52) U.S. Cl. .................. 709/217; 709/223; 709/224; 709/245; 707/3; 707/10; 707/100; 707/101; 707/104.1; 707/513; 345/168; 345/169; 345/170; 345/171; 345/172; 717/174; 717/176
(58) Field of Search ................ 709/223, 224, 709/245, 203, 217; 707/3, 10, 100–101, 104.1, 513; 345/168–172, 761; 717/174, 176

(56) References Cited

U.S. PATENT DOCUMENTS

| 5,751,961 A | 5/1998 | Smyk ..................... 395/200.47 |
| 5,761,418 A | 6/1998 | Francis et al. .......... 395/200.31 |
| 5,764,906 A | 6/1998 | Edelstein et al. ....... 395/200.49 |
| 5,764,908 A | 6/1998 | Shoji et al. ............. 395/200.47 |
| 5,781,900 A | 7/1998 | Shoji et al. ..................... 707/6 |
| 5,804,803 A | 9/1998 | Cragun et al. .............. 235/375 |
| 5,808,613 A | 9/1998 | Marrin et al. ................ 345/355 |
| 5,812,776 A | 9/1998 | Clifford ................. 395/200.47 |
| 5,818,446 A | 10/1998 | Bertram et al. ............. 345/334 |
| 5,848,417 A | 12/1998 | Shoji et al. ................... 707/102 |

FOREIGN PATENT DOCUMENTS

| EP | 0558054 A2 | 9/1993 |
| GB | 2319446 A | 5/1998 |
| JP | 61007936 A | 1/1986 |
| JP | 63265358 A | 11/1988 |
| JP | 06230844 A | 8/1994 |
| JP | 07085006 A | 3/1995 |
| JP | 09274646 A | 10/1997 |
| JP | 09311830 A | 12/1997 |
| JP | 09321633 A | 12/1997 |

(List continued on next page.)

*Primary Examiner*—Dung C. Dinh
*Assistant Examiner*—Hieu Le
(74) *Attorney, Agent, or Firm*—H. C. Chan

(57) ABSTRACT

When a user selects an arbitrary symbol 75 (word, phrase, sentence, graphic, image, etc.) from an arbitrary application 3 on a client computer 3, and copies this symbol 75 to a clipboard 79, a linker 23, being a terminate-and-stay-resident-type process, automatically captures that symbol 81 from the clipboard 79. Similarly, when a user types at a keyboard from an arbitrary application 207, those typed characters are first passed to an input method editor 201, where they are temporarily stored within a buffer 211, and when the user enters a prescribed "okay" key sequence the characters within that buffer 211 are converted as necessary and passed to the application 207, but if the user enters a prescribed "link" key sequence, a character string determining component 213 of the input method editor 201 passes the characters within the buffer 211 to a linker 209. In either case, the linker 23 sends the captured symbol to a URL server 5. The URL server 5 possesses a database 15, accumulated within which there are sets of symbols 105A, 105B, ... and URLs 107A, 107B, ... corresponding thereto, searches the database 15 and retrieves therefrom a URL corresponding to the received symbol 103, and returns that retrieved URL 109 to the linker 23. The linker 23 launches a WWW browser 21 and passes the URL 95 received from the server 5 to the WWW browser 21.

13 Claims, 24 Drawing Sheets

FOREIGN PATENT DOCUMENTS

| | | |
|---|---|---|
| JP | 10040084 A | 2/1998 |
| JP | 10049464 A | 2/1998 |
| JP | 10078928 A | 3/1998 |
| JP | 10124422 A | 5/1998 |
| JP | 10155038 A | 6/1998 |
| JP | 10161831 A | 6/1998 |
| JP | 10164256 A | 6/1998 |
| JP | 10187571 A | 7/1998 |
| JP | 10336345 A | 12/1998 |
| JP | 11328076 A | 11/1999 |
| WO | WO 97/19564 | 5/1997 |
| WO | WO 97/24684 | 7/1997 |
| WO | WO 99/22488 | 5/1999 |

SYSTEM AND A PROCESS FOR SPECIFYING A LOCATION ON A NETWORK

BACKGROUND

The present invention pertains to art for using a computer network or communications network, and in particular to art for easily specifying a physical location or a logical location on such a network, such locations, for example, including uniform resource locators (hereinafter "URLs") and electronic mail (hereinafter "e-mail") addresses in the case of the Internet, telephone numbers in the case of a telephone network, and so forth.

There are a wide variety of services available on computer networks, such as, for example, the Internet or various intranets, wherein information is provided or information is transferred, such as in connection with those services and resources available via the World Wide Web (hereinafter "WWW"), e-mail, file transfer protocol (hereinafter "FTP"), and the like. In using such services, it is necessary for a user to specify the location on the network of the source of any such information which is to be provided and the destination to which any such information is to be transferred.

For example, to access (as used here, "access" means to make a connection to a network location, e.g., a website, at which time a "home page," "index page," or the like may be returned by default to and opened by the computer that initiated the connection) and be able to see the contents of a particular website on the Internet using a WWW browser-type application (as used herein, "application" is used synonymously with "application program"), the user must specify for the browser-type application (hereinafter "browser") the URL representing the address of that website. Furthermore, to place a telephone call from a computer, the user must specify for the application that will dial the telephone number (hereinafter "dialup application") the telephone number that is to be dialed (here and below, where we refer to "dialing" of a telephone number, this is meant in its most general sense of placing a telephone call, regardless of the purpose of the call, e.g. voice, modem transmission, facsimile transmission, etc., and regardless of the method by which the call is placed, e.g. rotary-type pulses, touch-tone-type tones, etc.).

The most typical method for specifying a URL is to type in the URL from a keyboard. However, since URLs quite frequently consist of strings of more than ten, and often even more than twenty, characters, and since these character strings are moreover frequently such that they are not easily remembered by a human being, typing in a URL by hand is not at all an enjoyable task for the average user. The same can be said of typing in a telephone number.

As one method for simplifying the specification of URLs, the URL listing capability of WWW browsers, referred to variously as "Bookmarks," "Favorites," or the like, is known. However, as the number of entries in such a list grows, not only does it become increasingly difficult to quickly select the desired entry from among the others in the list, but it also becomes increasingly difficult to determine which list entry corresponds to which website. Furthermore, this capability cannot be taken advantage of with respect to URLs not entered in such a list, and in order to enter a URL into such a list in the first place, a user must either type in the URL by hand, or if utilizing a link from another website must first access the URL of the other website.

Furthermore, it may happen that while carrying out some task or the other at a particular application one wishes to obtain information pertaining to that task from a network. For example, while creating a document on the subject of intellectual property within a word-processing-type application (hereinafter "word processor") one may wish to visit the website of a government patent office to take advantage of resources or services offered by that patent office, or while creating a document on the subject of automobiles one may wish to visit the website of a particular automobile manufacturer to investigate the specifications of a particular type of automobile, and so forth. In such a case, a user must first stop what he is doing at the application he is currently using, and must then launch (as used here, "launch" means to cause execution of an application, or when the application has previously been executed and is currently running in background, as may be the case in multiple-program-loading-type or multitasking-type environments, may also by implication be taken to mean making an application running in background the active application) a WWW browser and specify the URL of the desired website. This represents quite an inconvenience to the user. The same is true with respect to dialing a telephone number.

SUMMARY

Accordingly, it is an object of the present invention to make it possible to specify a location on a communications network through a process that is both simple and user-friendly.

Furthermore, it is another object of the present invention to make it possible to specify a location on a communications network from an arbitrary application and receive network information services involving that location through a simple process.

One version of the present invention is directed to a simple and user-friendly process for specifying a location on a communications network. Furthermore, another version of the present invention is directed to a system that makes it possible to specify a location on a communications network through such a simple and user-friendly process. Furthermore, another version of the present invention is directed to an apparatus that makes it-possible to specify a location on a communications network through such a simple and user-friendly process. Furthermore, another version of the present invention is directed to a computer-readable recording medium containing a program capable of causing a computer to specify a location on a communications network through such a simple and user-friendly process. Furthermore, another version of the present invention is directed to a computer data signal embodied in a carrier wave capable of causing a computer to specify a location on a communications network through such a simple and user-friendly process. Furthermore, another version of the present invention is directed to a server that specifies a location on a communications network for use by a client computer through such a simple and user-friendly process. Furthermore, another version of the present invention is directed to a process of operating such a server. Furthermore, another version of the present invention is directed to a computer-readable recording medium containing a program for causing a computer to function as such a server. Furthermore, another version of the present invention is directed to a computer data signal embodied in a carrier wave for causing a computer to function as such a server.

The system in one version of the present invention is a system for specifying a location on a communications network for use by a network application for utilizing the aforesaid network on a computer, this network location specification system being equipped with a symbol receiving component that receives, from a memory area of the aforesaid computer that is capable of being used to transfer data from an application arbitrarily selected by a user to the exterior of this selected application, a symbol arbitrarily specified by the aforesaid user at the aforesaid selected application, and a converting component that converts the aforesaid symbol received by the aforesaid symbol receiving component into location information that represents a location previously set in correspondence to this symbol, and employs this location information to specify a location corresponding to the aforesaid symbol for use by the aforesaid network application.

That is, the system in one version of the present invention is a system for specifying a location on a communications network so as to make that location available for use by a network application, such as, for example, a WWW browser, an e-mail handling application (hereinafter "e-mailer"), or the like, on a computer, and is equipped with a symbol receiving component that receives a symbol arbitrarily specified by a user, and a converting component that converts the received symbol into location information representing a location previously set in correspondence thereto and that employs this location information to specify a location for use by the network application.

Here, the symbol referred to above may be anything capable of being displayed at the man-machine interface of a computer; for example, one may use text data, vector graphic data, bitmapped image data, audio data, a file, a folder, a directory, a path, and so forth. The symbol will preferably call to mind some meaning or concept for the user. Such a symbol will typically be a word, phrase, or sentence expressed in a language used by human beings, a graphical pattern designed by a human being, or the like. Trademarks, service marks, company names, personal names, titles, logotypes, advertising slogans, and the like are suitable for use as such symbols.

The aforesaid symbol receiving component is such that it can receive, or capture, a symbol from a computer memory area capable of being used to transfer data from an arbitrary application to the exterior of that application. When the user places a symbol in such a memory area, the symbol receiving component can capture that symbol. For example, in a preferred embodiment, the aforesaid memory area comprises a clipboard-type memory area (hereinafter "clipboard"), and the present system receives an arbitrary symbol from the clipboard after the user selects that symbol and copies it to the clipboard. Moreover, in a preferred embodiment, a pictorial representation (e.g., an icon, window, etc.) representing the present system is displayed at a desktop-like display (hereinafter "desktop") at the man-machine interface of the computer, and the aforesaid memory area comprises a memory area in which data from the aforesaid selected application is retained when a user drags and drops (i.e., using a mouse-type interface) the aforesaid data onto the aforesaid pictorial representation, the present system receiving the symbol by way of this memory area when the user drags and drops the symbol onto the pictorial representation.

The present system permits a location corresponding to a symbol to be specified for use by a network application as a result of the user's having specified this symbol at an arbitrary application and having caused this symbol to be passed to the present system. Accordingly, so long as the user is familiar with a symbol he is able to access the network location corresponding to that symbol. Corporate trade names and trademarks, personal names, and the like are typically used as such symbols, and the user is able to access the websites of such companies and people, or send e-mail to such companies and people, merely by specifying the appropriate symbols.

In addition, it is not necessary that the user specify the symbol from a network application, specification of the symbol being possible from any arbitrary application. For example, by selecting the name of a company from within a word processor application and placing this in a clipboard, a WWW browser can be made to automatically launch and access the website of that company.

In a preferred embodiment, the aforesaid computer is equipped with an input method editor that possesses a buffer, this buffer receiving and temporarily retaining therein a character or characters entered by a user from a keyboard-type input apparatus, and that transfers this retained character or these retained characters to a specified application, converting the character or characters should conversion thereof be necessary and not converting the character or characters should conversion thereof not be necessary, and the aforesaid memory area comprises the aforesaid buffer of the aforesaid input method editor.

Here, the aforesaid symbol may comprise text data, or it may comprise graphic data, bitmapped image data, or audio data.

In a preferred embodiment, the aforesaid converting component is equipped with a search requesting component that generates a search request for the symbol received by the aforesaid symbol receiving component, a searching component that possesses a database in which there are accumulated a multiplicity of sets of symbols and location information corresponding thereto, and that searches the aforesaid database and retrieves therefrom location information corresponding to the aforesaid symbol in response to a search request from the aforesaid search requesting component, and a location information receiving component that receives the aforesaid location information retrieved by the aforesaid searching component, and that specifies a location corresponding to the aforesaid symbol for use by the aforesaid network application.

Here, the aforesaid symbol receiving component, and the search requesting component and the location information receiving component of the aforesaid converting component, may exist within the aforesaid computer, and the aforesaid searching component of the aforesaid converting component may exist within a computer other than the aforesaid computer but capable of communicating with the aforesaid computer. Alternatively, the aforesaid symbol receiving component and the aforesaid converting component may both entirely exist within the aforesaid computer.

Furthermore, in a preferred embodiment, the aforesaid converting component possesses a searching component that exists at a prescribed location on the aforesaid network and that possesses a database in which there are accumulated a multiplicity of sets of symbols and location information corresponding thereto, and possesses a search requesting component that generates a search request for the symbol received by the aforesaid symbol receiving component and that passes to the aforesaid network application the aforesaid search request and previously prepared information representing the aforesaid prescribed location of the aforesaid searching component, as a result of which the aforesaid network application operates, gains access to the aforesaid searching component, and causes the aforesaid search request to be passed to the aforesaid searching component, wherein the aforesaid searching component searches the aforesaid database and retrieves therefrom location information corresponding to the aforesaid received symbol in response to the aforesaid search request from the aforesaid network application, and sends the aforesaid retrieved location information to the aforesaid network application, as a result of which a location corresponding to the aforesaid received symbol is specified for use by the aforesaid network application.

Moreover, in a preferred embodiment, the aforesaid converting component possesses a cache file in which there are accumulated sets of symbols and location information that have been converted at some time in the past.

In addition, in a preferred embodiment, the aforesaid symbol receiving component possesses a symbol link web in which there are accumulated a plurality of mutually linked symbols set by the user, and a symbol selecting component that selects for use in place of the aforesaid received symbol another symbol linked to the aforesaid received symbol at the aforesaid symbol link web, and that passes this selected other symbol to the aforesaid converting component.

The process in one version of the present invention is a process for specifying a location on a communications network for use by a network application for utilizing the aforesaid network on a computer, this network location specification process comprising a symbol receiving step in which a symbol arbitrarily specified by a user at an application arbitrarily selected by the aforesaid user is received from a memory area of the aforesaid computer that is capable of being used to transfer data from this selected application to the exterior of the aforesaid selected application, and a converting step in which the aforesaid symbol received at the aforesaid symbol receiving step is converted into location information that represents a location previously set in correspondence to this symbol, and this location information is employed to specify a location corresponding to the aforesaid symbol for use by the aforesaid network application.

The apparatus in one version of the present invention is an apparatus for specifying a location on a communications network for use by a network application for utilizing the aforesaid network on a computer, this network location specification apparatus being provided on the aforesaid computer and being equipped with a symbol receiving component that receives, from a memory area of the aforesaid computer that is capable of being used to transfer data from an application arbitrarily selected by a user to the exterior of this selected application, a symbol arbitrarily specified by the aforesaid user at the aforesaid selected application, a search requesting component that sends a search request for the aforesaid symbol received by the aforesaid symbol receiving component to a database existing either on the aforesaid computer or on the aforesaid network, and a location information receiving component that receives search results returned from the aforesaid database pursuant to the aforesaid search request, and, in the event that location information representing a location on the aforesaid network corresponding to the aforesaid symbol is included within these search results, employs this location information to specify a location corresponding to the aforesaid symbol for use by the aforesaid network application.

Furthermore, in a preferred embodiment, the aforesaid memory area comprises a clipboard.

Moreover, in a preferred embodiment, the aforesaid apparatus possesses a pictorial representation representing the aforesaid network location specification apparatus on a display at the man-machine interface of the aforesaid computer, and the aforesaid memory area comprises a memory area in which data from the aforesaid selected application is retained when a user drags and drops the aforesaid data onto the aforesaid pictorial representation.

In addition, in a preferred embodiment, the aforesaid computer is equipped with an input method editor that possesses a buffer, this buffer receiving and temporarily retaining therein a character or characters entered by a user from a keyboard-type input apparatus, and that transfers this retained character or these retained characters to a specified application, converting the character or characters should conversion thereof be necessary and not converting the character or characters should conversion thereof not be necessary, and the aforesaid memory area comprises the aforesaid buffer of the aforesaid input method editor.

The process in one version of the present invention is a process for specifying a location on a communications network for use by a network application for utilizing the aforesaid network on a computer, this network location specification process being carried out by the aforesaid computer and comprising a symbol receiving step in which a symbol arbitrarily specified by a user at an application arbitrarily selected by the aforesaid user is received from a memory area of the aforesaid computer that is capable of being used to transfer data from the aforesaid selected application to the exterior of the aforesaid selected application, a search requesting step in which a search request for the aforesaid symbol received at the aforesaid symbol receiving step is sent to a database existing either on the aforesaid computer or on the aforesaid network, and a location information receiving step in which search results returned from the aforesaid database pursuant to the aforesaid search request are received, and, in the event that location information representing a location on the aforesaid network corresponding to the aforesaid symbol is included within these search results, this location information is employed to specify a location corresponding to the aforesaid symbol for use by the aforesaid network application.

The computer-readable recording medium in one version of the present invention is a computer-readable recording medium embodied within which there is a program for causing a computer to carry out a process for specifying a location on a communications network for use by a network application for utilizing the aforesaid network, the aforesaid process comprising a symbol receiving step in which a symbol arbitrarily specified by a user at an application arbitrarily selected by the aforesaid user is received from a memory area of the aforesaid computer that is capable of being used to transfer data from the aforesaid selected application to the exterior of the aforesaid selected application, a search requesting step in which a search request for the aforesaid symbol received at the aforesaid symbol receiving step is sent to a database existing either on the aforesaid computer or on the aforesaid network, and a location information receiving step in which search results returned from the aforesaid database pursuant to the aforesaid search request are received, and, in the event that location information representing a location on the aforesaid network corresponding to the aforesaid symbol is included within these search results, this location information is employed to specify a location corresponding to the aforesaid symbol for use by the aforesaid network application.

The computer data signal embodied in a carrier wave in one version of the present invention is a computer data signal embodied in a carrier wave for causing a computer to carry out an operation in which a location on a communications network is specified for use by a network application for utilizing the aforesaid network, this computer data signal comprising a program code segment for executing a symbol receiving step in which a symbol arbitrarily specified by a user at an application arbitrarily selected by the aforesaid user is received from a memory area of the aforesaid computer that is capable of being used to transfer data from the aforesaid selected application to the exterior of the aforesaid selected application, a program code segment for executing a search requesting step in which a search request for the aforesaid symbol received at the aforesaid symbol receiving step is sent to a database existing either on the aforesaid computer or on the aforesaid network, and a program code segment for executing a location information receiving step in which search results returned from the aforesaid database pursuant to the aforesaid search request are received, and, in the event that location information representing a location on the aforesaid network corresponding to the aforesaid symbol is included within these search results, this location information is employed to specify a location corresponding to the aforesaid symbol for use by the aforesaid network application.

The server in one version of the present invention is a server for specifying a location on a communications network for use by a client computer that utilizes the aforesaid network, this network location specification server being capable of communicating with the aforesaid client computer and being equipped with a search request receiving component that receives from the aforesaid client computer a search request for a symbol specified by a user at the aforesaid client computer, a database in which there are accumulated a multiplicity of sets of symbols and location information corresponding thereto, and a searching component that searches the aforesaid database for location information corresponding to the symbol specified by the aforesaid user and returns the results thereof to the aforesaid client computer in response to the search request received by the aforesaid search request receiving component.

The process of operating a server in one version of the present invention is a process of operating a server for specifying a location on a communications network for use by a client computer that utilizes the aforesaid network, this network location specification server operating process comprising a search request receiving step in which a search request for a symbol specified by a user at the aforesaid client computer is received from the aforesaid client computer, and a searching step in which a database, accumulated within which there are a multiplicity of sets of symbols and location information corresponding thereto, is accessed, the aforesaid database is searched for location information corresponding to the symbol specified by the aforesaid user, and the results thereof are returned to the aforesaid client computer in response to the received search request.

The computer-readable recording medium of one version of the present invention is a computer-readable recording medium embodied within which there is a program for causing a computer to function as a server for specifying a location on a communications network for use by a client computer that utilizes the aforesaid network, the aforesaid server being capable of communicating with the aforesaid client computer and being equipped with a search request receiving component that receives from the aforesaid client computer a search request for a symbol specified by a user at the aforesaid client computer, a database in which there are accumulated a multiplicity of sets of symbols and location information corresponding thereto, and a searching component that searches the aforesaid database for location information corresponding to the symbol specified by the aforesaid user and returns the results thereof to the aforesaid client computer in response to the search request received by the aforesaid search request receiving component.

The computer data signal embodied in a carrier wave of one version of the present invention is computer data signal embodied in a carrier wave for causing a computer to function as a server for specifying a location on a communications network for use by a client computer that utilizes the aforesaid network, this computer data signal comprising a program code segment for executing a step in which a search request for a symbol specified by a user at the aforesaid client computer is received from the aforesaid client computer, and a program code segment for executing a step in which a database, accumulated within which there are a multiplicity of sets of symbols and location information corresponding thereto, is accessed, the aforesaid database is searched for location information corresponding to the symbol specified by the aforesaid user, and the results thereof are returned to the aforesaid client computer in response to the aforesaid received search request.

The apparatus in one version of the present invention is an apparatus for specifying a location on a communications network for use by a network application for utilizing the aforesaid network on a computer, this network location specification apparatus being provided on the aforesaid computer and being equipped with a symbol capturing component that captures an arbitrary symbol specified by a user at a second application different from the aforesaid network application on the aforesaid computer when such symbol is so specified, a search requesting component that sends a search request for the aforesaid symbol captured by the aforesaid symbol capturing component to a database existing either on the aforesaid computer or on the aforesaid network, and a location information receiving component that receives search results returned from the aforesaid database pursuant to the aforesaid search request, and, in the event that location information representing a location on the aforesaid network corresponding to the aforesaid symbol is included within these search results, employs this location information to specify a location corresponding to the aforesaid symbol for use by the aforesaid network application.

Here, in a preferred embodiment, the aforesaid symbol capturing component is capable of capturing a symbol copied to a clipboard by a user at the aforesaid second application.

Furthermore, in a preferred embodiment, the aforesaid apparatus possesses a pictorial representation representing the aforesaid network location specification apparatus on a display at the man-machine interface of the aforesaid computer, and the aforesaid symbol capturing component is capable of capturing a symbol dragged and dropped onto the aforesaid pictorial representation from the aforesaid second application by a user at the aforesaid display of the man-machine interface.

Moreover, in a preferred embodiment, the aforesaid computer is equipped with an input method editor that receives and temporarily retains therein a character or characters entered by a user from a keyboard-type input apparatus, and that transfers this retained character or these retained characters to the aforesaid second application, converting the character or characters should conversion thereof be necessary and not converting the character or characters should conversion thereof not be necessary, and the aforesaid symbol capturing component is capable of capturing the character string retained in the aforesaid input method editor when the aforesaid user enters a prescribed key sequence from the aforesaid keyboard-type input apparatus.

The process in one version of the present invention is a process for specifying a location on a communications network for use by a network application for utilizing the aforesaid network on a computer, this network location specification process being carried out by the aforesaid computer and comprising a symbol capturing step in which an arbitrary symbol specified by a user at a second application different from the aforesaid network application on the aforesaid computer is captured when such symbol is so specified, a search requesting step in which a search request for the aforesaid symbol captured at the aforesaid symbol capturing step is sent to a database existing either on the aforesaid computer or on the aforesaid network, and a location information receiving step in which search results returned from the aforesaid database pursuant to the aforesaid search request are received, and, in the event that location information representing a location on the aforesaid network corresponding to the aforesaid symbol is included within these search results, this location information is employed to specify a location corresponding to the aforesaid symbol for use by the aforesaid network application.

The computer-readable recording medium in one version of the present invention is a computer-readable recording medium embodied within which there is a program for causing a computer to carry out a process for specifying a location on a communications network for use by a network application for utilizing the aforesaid network, the aforesaid process comprising a symbol capturing step in which an arbitrary symbol specified by a user at a second application different from the aforesaid network application on the aforesaid computer is captured when such symbol is so specified, a search requesting step in which a search request for the aforesaid symbol captured at the aforesaid symbol capturing step is sent to a database existing either on the aforesaid computer or on the aforesaid network, and a location information receiving step in which search results returned from the aforesaid database pursuant to the aforesaid search request are received, and, in the event that location information representing a location on the aforesaid network corresponding to the aforesaid symbol is included within these search results, this location information is employed to specify a location corresponding to the aforesaid symbol for use by the aforesaid network application.

The computer data signal embodied in a carrier wave in one version of the present invention is a computer data signal embodied in a carrier wave for causing a computer to carry out an operation in which a location on a communications network is specified for use by a network application for utilizing the aforesaid network, this computer data signal comprising a program code segment for executing a symbol capturing step in which an arbitrary symbol specified by a user at a second application different from the aforesaid network application on the aforesaid computer is captured when such symbol is so specified, a program code segment for executing a search requesting step in which a search request for the aforesaid symbol captured at the aforesaid symbol capturing step is sent to a database existing either on the aforesaid computer or on the aforesaid network, and a program code segment for executing a location information receiving step in which search results returned from the aforesaid database pursuant to the aforesaid search request are received, and, in the event that location information representing a location on the aforesaid network corresponding to the aforesaid symbol is included within these search results, this location information is employed to specify a location corresponding to the aforesaid symbol for use by the aforesaid network application.

The apparatus in one version of the present invention is an apparatus for specifying a location on a communications network for use by a network application for utilizing the aforesaid network on a computer, this network location specification apparatus being provided on the aforesaid computer and equipped with a symbol capturing component that captures an arbitrary symbol specified by a user at a second application different from the aforesaid network application on the aforesaid computer when such symbol is so specified, and a search requesting component that creates a search request for the aforesaid symbol captured by the aforesaid symbol capturing component and passes the aforesaid search request and information representing the location of a prescribed server existing on the aforesaid network to the aforesaid network application, as a result of which the aforesaid network application operates and causes the aforesaid search request to be transmitted to the aforesaid server, wherein the aforesaid server possesses a database in which there are accumulated a multiplicity of sets of symbols and location information corresponding thereto, searches the aforesaid database and retrieves therefrom location information corresponding to the aforesaid captured symbol in response to the aforesaid search request from the aforesaid network application, and sends the aforesaid retrieved location information to the aforesaid network application, as a result of which a location corresponding to the aforesaid captured symbol is specified for use by the aforesaid network application.

Here, in a preferred embodiment, the aforesaid symbol capturing component is capable of capturing a symbol copied to a clipboard by a user at the aforesaid second application.

Furthermore, in a preferred embodiment, the aforesaid network location specification apparatus possesses a pictorial representation representing the aforesaid network location specification apparatus on a display at the man-machine interface of the aforesaid computer, and the aforesaid symbol capturing component is capable of capturing a symbol dragged and dropped onto the aforesaid pictorial representation from the aforesaid second application by a user at the aforesaid display of the man-machine interface.

Moreover, in a preferred embodiment, the aforesaid computer is equipped with an input method editor that receives and temporarily retains therein a character or characters entered by a user from a keyboard-type input apparatus, and that transfers this retained character or these retained characters to the aforesaid second application, converting the character or characters should conversion thereof be necessary and not converting the character or characters should conversion thereof not be necessary, and the aforesaid symbol capturing component is capable of capturing the character string retained in the aforesaid input method editor when the aforesaid user enters a prescribed key sequence from the aforesaid keyboard-type input apparatus.

The process in one version of the present invention is a process for specify a location on a communications network for use by a network application for utilizing the aforesaid network on a computer, this network location specification process being carried out by the aforesaid computer and comprising a symbol capturing step in which an arbitrary symbol specified by a user at a second application different from the aforesaid network application on the aforesaid computer is captured when such symbol is so specified, and a search requesting step in which a search request for the aforesaid symbol captured at the aforesaid symbol capturing step is created and the aforesaid search request and information representing the location of a prescribed server existing on the aforesaid network are passed to the aforesaid network application, as a result of which the aforesaid network application operates and causes the aforesaid search request to be transmitted to the aforesaid server, wherein the aforesaid server possesses a database in which there are accumulated a multiplicity of sets of symbols and location information corresponding thereto, searches the aforesaid database and retrieves therefrom location information corresponding to the aforesaid captured symbol in response to the aforesaid search request from the aforesaid network application, and sends the aforesaid retrieved location information to the aforesaid network application, as a result of which a location corresponding to the aforesaid captured symbol is specified for use by the aforesaid network application.

The computer-readable recording medium in one version of the present invention is a computer-readable recording medium embodied within which there is a program for causing a computer to carry out a process for specifying a location on a communications network for use by a network application for utilizing the aforesaid network, the aforesaid process comprising a symbol capturing step in which an arbitrary symbol specified by a user at a second application different from the aforesaid network application on the aforesaid computer is captured when such symbol is so specified, and a search requesting step in which a search request for the aforesaid symbol captured at the aforesaid symbol capturing step is created and the aforesaid search request and information representing the location of a prescribed server existing on the aforesaid network are passed to the aforesaid network application, as a result of which the aforesaid network application operates and causes the aforesaid search request to be transmitted to the aforesaid server, wherein the aforesaid server possesses a database in which there are accumulated a multiplicity of sets of symbols and location information corresponding thereto, searches the aforesaid database and retrieves therefrom location information corresponding to the aforesaid captured symbol in response to the aforesaid search request from the aforesaid network application, and sends the aforesaid retrieved location information to the aforesaid network application, as a result of which a location corresponding to the aforesaid captured symbol is specified for use by the aforesaid network application.

The computer data signal embodied in a carrier wave in one version of the present invention is a computer data signal embodied in a carrier wave for causing a computer to carry out an operation in which a location on a communications network is specified for use by a network application for utilizing the aforesaid network, this computer data signal comprising a program code segment for executing a symbol capturing step in which an arbitrary symbol specified by a user at a second application different from the aforesaid network application on the aforesaid computer is captured when such symbol is so specified, and a program code segment for executing a search requesting step in which a search request for the aforesaid symbol captured at the aforesaid symbol capturing step is created and the aforesaid search request and information representing the location of a prescribed server existing on the aforesaid network are passed to the aforesaid network application, as a result of which the aforesaid network application operates and causes the aforesaid search request to be transmitted to the aforesaid server, wherein the aforesaid server possesses a database in which there are accumulated a multiplicity of sets of symbols and location information corresponding thereto, searches the aforesaid database and retrieves therefrom location information corresponding to the aforesaid captured symbol in response to the aforesaid search request from the aforesaid network application, and sends the aforesaid retrieved location information to the aforesaid network application, as a result of which a location corresponding to the aforesaid captured symbol is specified for use by the aforesaid network application.

The system in one version of the present invention is a system for specifying a location on a network for use by a network application (e.g., a WWW browser, e-mailer, etc.) on a computer, and is equipped with:

(1) an input method editor (hereinafter "IME") that receives and temporarily retains therein a character or characters entered by a user from a keyboard-type input apparatus of a computer, and that transfers this retained character or these retained characters to a specified application, converting the character or characters should conversion thereof be necessary and not converting the character or characters should conversion thereof not be necessary, (2) a converting component that receives a character or characters, converts the received character or characters into location information that represents a location previously set in correspondence to this character or these characters, and employs this location information to specify a location corresponding to the received character or characters for use by a network application, and (3) a determining component associated with the aforesaid IME or internal to the aforesaid IME that passes a character or characters retained in the IME to the aforesaid converting component when a user enters a prescribed key sequence from a keyboard-type input apparatus.

This network location specification system allows an arbitrary character or characters (a word, phrase, clause, sentence, or the like) to be passed to the converting component, the character or characters to be converted into corresponding network location information, and the network location information to be passed to a network application upon the pressing of a prescribed key when the user has entered the character or characters (a word, phrase, clause, sentence, or the like) by way of the IME at a word processor, tabular calculation-type application (hereinafter "spreadsheet"), or other arbitrary application. For example, it is possible to access the website of a company or individual, send e-mail to a company or individual, and so forth upon the pressing of a prescribed key when the trade name or trademark of the company, the name of the person, or the like has been entered at the application by way of the IME.

A system according to one aspect of the present invention, being a system for specifying a location on a communications network for use by a communications application that accesses the aforesaid communications network on a computer, is a system equipped with a character string capturing component that captures a character string selected by a user at a display screen of a computer, a location character string extracting component that extracts a character string representing a location on a communications network from the captured character string, and a location specifying component that specifies an extracted character string for use by a communications application, as a result of which the communications application operates and causes communications involving the location represented by the extracted character string to be carried out.

This system allows a location on a network to automatically be specified for use by a communications application and communications involving that location to be carried out upon selection of an arbitrary character string containing a character string (e.g., a telephone number, URL, e-mail address, etc.) representing that location by a user at the display of a computer.

In a preferred embodiment, there is another application on the computer; for example, a word processor or spreadsheet software or the like, which is different from the communications application and which is capable of handling text. The user can then, while performing some task at an arbitrary such application, select an arbitrary character string on a display screen at the user interface of that application and pass that character string to the character string capturing component. For example, a passage containing a telephone number might be selected within a document that is being edited in a word processor application, upon which a dialup application would be launched and the telephone number contained within the passage would automatically be dialed. In like manner, a facsimile-type communications application (hereinafter "fax application") might be launched and facsimile communications automatically carried out.

A system according to another aspect of the present invention, being a system for specifying a telephone number for use by a dialup application on a computer, is a system equipped with a character string capturing component that captures a character string selected by a user at a display screen of a computer; a database containing a plurality of words and a plurality of telephone numbers linked thereto; a comparing component that compares a captured character string and words within the aforesaid database, and, if a match therebetween is obtained, selects a telephone number linked to a matched word; and a number specifying component that specifies a selected telephone number for use by the dialup application, as a result of which the dialup application operates and causes the selected telephone number to be dialed.

This system permits a telephone number previously linked to an arbitrary character string to be automatically dialed as a result of selection of that character string by a user at the display of a computer.

The present invention is typically carried out through use of a computer, and the computer program for accomplishing this may be installed or loaded into computer by way of any of a variety of media, including disk-type storage, semiconductor memory, communications signals, or the like. Furthermore, at least a portion of the present invention may be carried out using specialized hardware. Furthermore, the system of the present invention may be carried out on a single computer machine unit or may be carried out in distributed fashion over a plurality of computer machine units.

BRIEF DESCRIPTION OF DRAWINGS

These and other features, aspects, and advantages of the present invention will become better understood with reference to the following description, appended claims, and accompanying drawings where

FIG. 17 through FIG. 37 show examples of Japanese character entry and display under the Japanese version of "Windows."

DESCRIPTION

Figure 1:
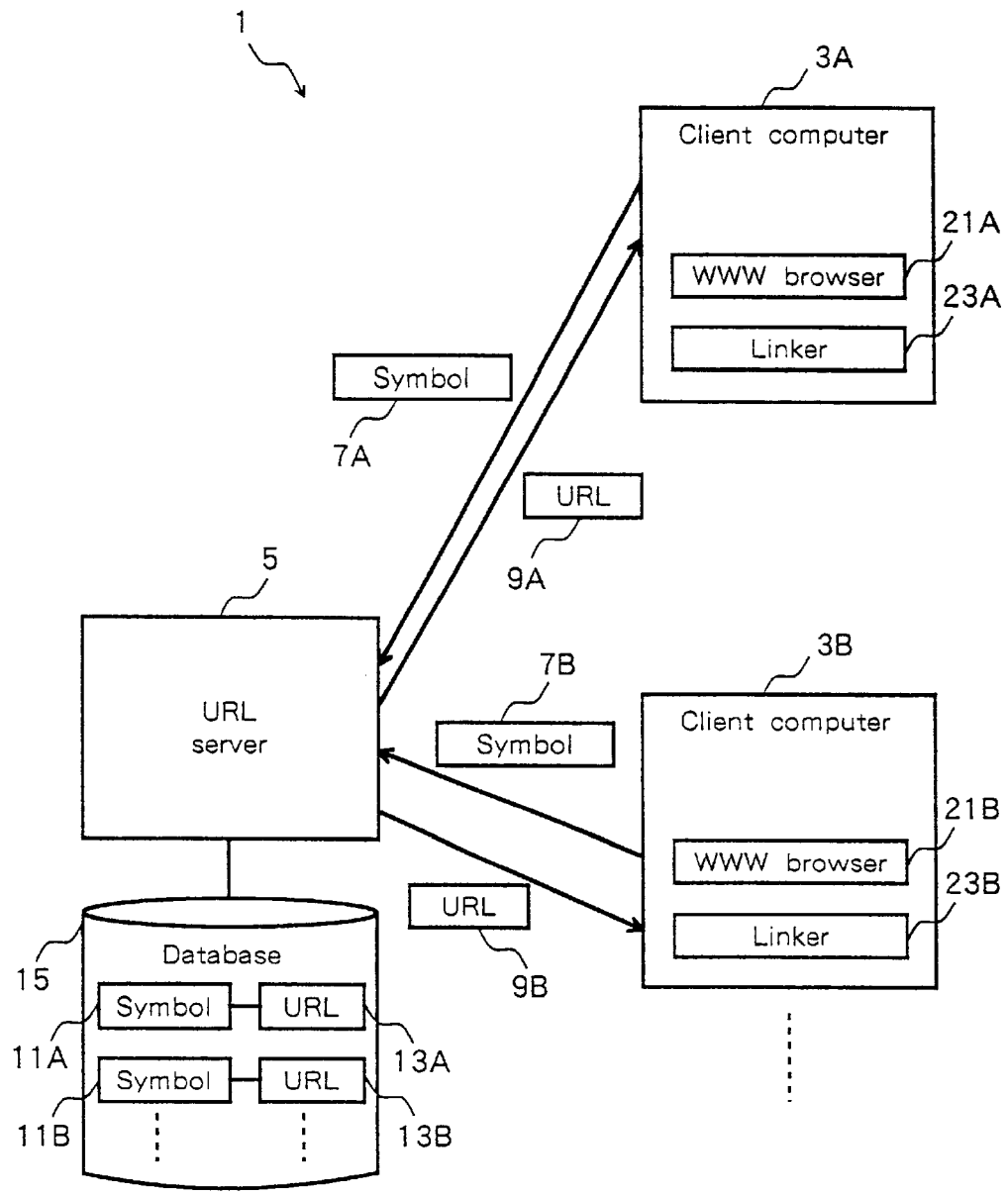
FIG. 1 is a drawing showing the overall constitution of one embodiment of a network location specification system according to the present invention.

FIG. 1 shows the overall constitution of one embodiment of a network location specification system according to the present invention.

Whereas in this embodiment a version of the present invention is described in terms of an example in which a URL is specified for use by a WWW browser on a computer utilizing the Internet, it will nonetheless be readily apparent to one of ordinary skill in the art upon a reading of the following description of the embodiment that the principles of the present invention are not limited to Internet URLs, but may also be applied to specification of a wide variety of different types of locations on a wide variety of different types of computer networks.

A system 1 shown in FIG. 1 comprises a plurality of client computers 3A, 3B . . . capable of being connected to the Internet, and at least one URL server 5 capable of two-way communication with these client computers 3A, 3B, . . . . Installed on each of the client computers 3A, 3B, . . . is a WWW browser 21A, 21B, . . . and a program resident in random-access memory (e.g., a terminate-and-stay-resident-type program) which shall be referred to as a "linker" 23A, 23B, . . . . The URL server 5 typically exists at a location on the Internet, and typically communicates in two-way fashion with the client computers 3A, 3B, . . . by means of, for example, hypertext transport protocol (hereinafter "HTTP"). The URL server 5 possesses a database 15, accumulated within which there are a multiplicity of symbols 11A, 11B, . . . and a multiplicity of URLs 13A, 13B, . . . corresponding thereto and linked therewith (except where specifically indicated, the word "link" as used herein does not refer to and should not to be confused with hypertext "jumps" or "links" created using HyperText Markup Language HREF statements and the like).

As used here, "symbol" refers to a data representation (symbol) that is capable of being recognized by one or more of the human senses and remembered by a human being, and that is capable of being specified by a human being to a computer by way of a man-machine interface of that computer. While the most typical examples of such symbols include text data such as letters and other characters commonly capable of being handled by any of a wide a variety of applications such as desktop-publishing-type (herein after "DTP") and spreadsheet-type applications, examples of which include words, phrases, clauses, sentences, textual passages, and the like, such symbols are certainly not limited to text data, but may include vector graphic data such as may be capable of being handled by a draw-type graphics application, and bitmapped image data such as may be capable of being handled by a paint-type graphics application. Moreover, such a symbol may also comprise three-dimensional graphic data representing a solid object or objects such as may be capable of being handled by a three-dimensional graphics application. In addition, such symbols are not limited to those representations capable of being perceived by the sense of sight, but may include representations that are capable of being perceived auditorily, such as, for example, data capable of reproducing a melody or rhythm. It is desirable that the symbol represent some meaning or concept. Random numeric sequences and the like which tend not to evoke any concept or meaning in the mind of a human being are not suitable for use as such a symbol. Conversely, words, phrases, clauses, sentences, textual passages, trademarks, service marks, logotypes, advertising slogans, company names, personal names, designations, and the like are ideal for use as such symbols. Geographical references, place names, street addresses, telephone numbers, and so forth are also suitable for use as such symbols.

Users at the client computers 3A, 3B, . . . can specify arbitrary symbols to the linkers 23A, 23B, . . . within the client computers 3A, 3B, . . . . The linkers 23A, 23B, . . . within the client computers 3A, 3B, . . . transmit requests to the URL server 5 to perform searches using the specified symbols 7A, 7B, . . . as keywords (i.e., words which will be attempted to be found). Using the specified symbols 7A, 7B, . . . as keywords, the URL server 5 searches the contents of a database 15 and retrieves therefrom URLs 9A, 9B, . . . , which correspond to the symbols 7A, 7B, . . . which were included within the search requests received from the client computers 3A, 3B, . . . . The URL server 5, moreover, returns the retrieved URLs 9A, 9B, . . . to the linkers 23A, 23B, . . . within the client computers 3A, 3B, . . . Upon receiving the URLs 9A, 9B, . . . which were returned from the URL server 5, the linkers 23A, 23B. . . within the client computers 3A, 3B, . . . launch WWW browsers 21A, 21B, . . . , passing thereto the URLs 9A, 9B,. The WWW browsers 21A, 21B, . . . then access websites at the URLs 9A, 9B, As a result of the above operation, users at the client computers 3A, 3B, . . . are able to achieve the same effect by specification of symbols as would result from specification of URLs. For example, specification of the symbol "Japanese Patent Office" could be employed to effect accessing of the website of the Japanese Patent Office. It is therefore only necessary that a user know the symbol for the website he wishes to visit, there being no need to know the URL thereof. Text, graphics, or like representations easily remembered by human beings may be set as symbols. For example, company names or trademarks, advertising slogans such as "conveniently located near such-and-such subway stop" or the like, pictures of logotypic animal personalities (mascot-like characters), and other such symbols easily remembered by the user may be set as symbols to represent websites of companies. Accordingly, it will in general be much easier for the user to specify such a symbol than to specify the corresponding URL. And even when using a list of the "Bookmarks" or "Favorites" variety, it will be much easier to find the desired entry from among the others in the list when the entry has been entered in the form of a symbol.

A plurality of symbols can be set to represent a single URL. For example, three different types of symbols—the company name, a pictorial figure, and a slogan—might be set to represent the website of a company. Conversely, the same symbol might be assigned to a plurality of URLs. For example, a name that is symbolic of a particular group of affiliated companies might be set to represent the URLs of a plurality of companies belonging to that group.

When searching for a symbol that comprises image (including graphic) or sound data, art from the field of optical or acoustical pattern recognition can be employed to assist in determination of whether or not a match (hereinafter "hit") exists.

Figure 2:
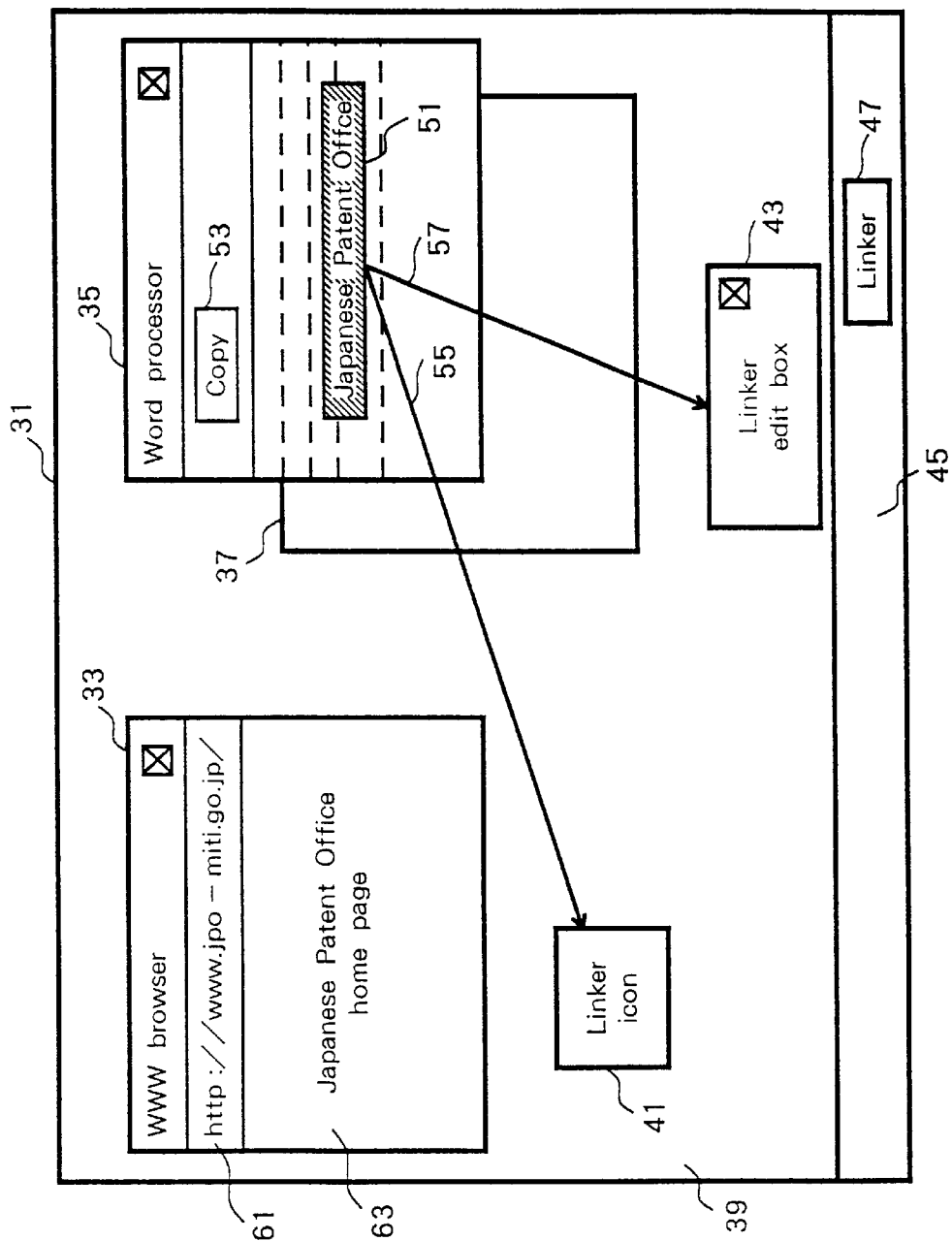
FIG. 2 is a drawing for explaining an example of a display 31 at a man-machine interface of a client computer 3 during specification of a symbol by a user.

FIG. 2 shows an example of a display 31 at a man-machine interface of a client computer 3 during specification of a symbol by a user. Note that while the example shown in FIG. 2 incorporates a "Windows"-type environment such as is a feature of certain operating systems sold by Microsoft Corporation of Redmond, Wash., USA (hereinafter simply "Windows" environment), from the description thereof it will be readily apparent to one of ordinary skill in the art how the equivalent effect might be achieved on different operating systems.

In FIG. 2, at the time shown, window-like subregions of the display (hereinafter "windows") 33, 35, 37 belonging to a number of applications which a user has already launched, including a WWW browser 21 and a word processor, are shown open on the desktop 39 at a display 31. A box-shaped area for acceptance of user input (hereinafter "edit box") 43 of a linker 23 is likewise open. There is also an icon-type representation (hereinafter "icon") 41 of the linker 23 on the desktop 39. There is a control button 47 for the linker 23 in a bar-shaped menu (hereinafter "task bar") 45 at the edge of the display 31.

The user can enable or disable the linker 23, for example, by clicking or alternatively by double-clicking (i.e., using a mouse-type interface; hereinafter "mouse") the linker control button 47 within the task bar 45. Only when the linker 23 is enabled is it possible to place a symbol in the linker 23 as a result of the procedure to be described below.

Here, let us take the case in which a user decides, during the course of, for example, creating a document using an arbitrary application, say a word processor, that he wants to access the website of the Japanese Patent Office. In such a case, if the words "Japanese Patent Office" 51, which we will in our example assume constitute a symbol for the Japanese Patent Office, happen to appear in the document the user is currently working on, the user might select these words using directional keys (hereinafter "arrow keys") on a keyboard, a mouse, and so forth, or he might select these words by typing in "Japanese Patent Office" 51 from a keyboard, but in any case we will assume that the selected words "Japanese Patent Office" 51 are now displayed in reverse video (i.e., "highlighted") on the display. Next, the user can employ whichever he prefers of a number of possible procedures such as, for example procedures 1) through (3) to be described below, to pass the selected words "Japanese Patent Office" 51 as a symbol to the linker 23.

(1) Copy the words "Japanese Patent Office" 51 to a clipboard. This might be done, for example, by entering a key sequence such as, for example, Control+C (the "+" indicating that more than one key is to be held down simultaneously), or by, for example, clicking on a certain copy button 53 within a tool bar (a bar-shaped menu similar in concept to the task bar of the operating system) at the word processor window 35.

(2) Drag and drop (i.e., using a mouse) the words "Japanese Patent Office" 51 onto the icon 41 of the linker 23 as indicated by arrow 55 in the drawing.

(3) Drag and drop so as to copy the words "Japanese Patent Office" 51 into the edit box 43 of the linker 23 as indicated by arrow 57 in the drawing, and then okay (i.e., finalize) selection of "Japanese Patent Office" 51 by pressing the RETURN key or the like. Furthermore, note that it is also possible to select from among a list of linked candidates at this time; for example, in the event that the words "Japanese Patent" were dragged and dropped into the edit box 43 from the word processor, the words "Japanese Patent" might be changed to "Japanese Patent Office" at the edit box 43 by means of a simple prescribed key sequence prior to okaying selection thereof.

After carrying out one of the above procedures, or a procedure equivalent in effect thereto, the linker 23 receives the words "Japanese Patent Office" 51 and sends these words to the URL server 5 as described above, upon which these words are converted to "http://www.jpo-miti.go.jp/", the URL of the Japanese Patent Office's website, and a command to launch the WWW browser 21 is issued with this URL being passed thereto. As a result, the URL of the Japanese Patent Office's website, "http://www.jpo-miti.go.jp/", has been specified for use by the WWW browser 21, the effect of which is that this URL, "http://www.jpo-miti.go.jp/" 61, and the Japanese Patent Office's home page 63, are displayed at the window 33 of the WWW browser 21.

Furthermore, as other methods of specifying a symbol for use by the linker 23, the symbol can be typed in directly at the linker edit box 43, or the symbol may be entered in place of the URL at the "Address:" or "Location:" or other such input field for entry of the site to be accessed, at the window 33 of the WWW browser, and so forth.

Figure 3:
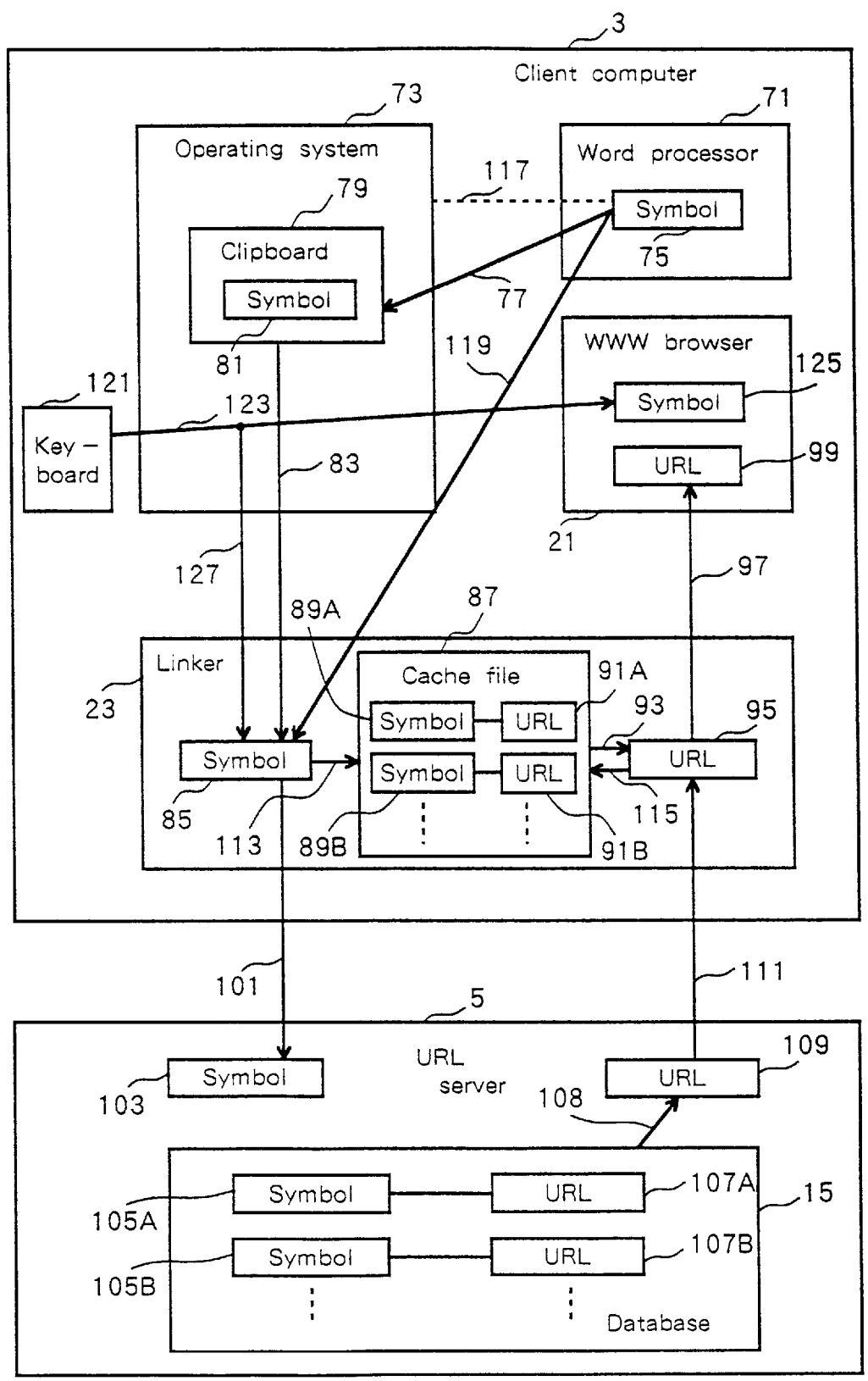
FIG. 3 is a block diagram showing the internal structure and function of a client computer 3 and a URL server 5.

FIG. 3 shows the internal structure and function of a client computer 3 and a URL server 5 for carrying out the aforementioned operations.

Within a client computer 3, a linker 23 monitors a clipboard 79, a memory area managed by the operating system, which may, for example, be "OS73," a product of Microsoft Corporation of Redmond, Wash., USA. When a certain symbol 75 is copied from a memory area of a certain application, say a word processor 71, to the clipboard 79 (arrow 77), the linker 23 captures the symbol 81 that is within that clipboard 79 (arrow 83). The linker 23 then looks in a cache file 87 which it possesses to see if the same symbol as the captured symbol 85 is contained therein. Stored within the cache file 87 are the n most recently handled sets of symbols 89A, 89B, . . . and URLs 91A, 91B, . . . that have been handled by the linker 23, where n is a prescribed number. If one of the symbols (e.g., 89B) within this cache file 87 is found to be the same as the captured symbol 85, the linker 23 reads a URL 91B corresponding to that symbol 89B from the cache file 87 (arrow 93), and passes this URL 95 which it has read to the WWW browser 21 (arrow 97).

If there is no symbol within the cache file 87 that is found to be the same as the captured symbol 85, the linker 23 sends a search request to the URL server S with that symbol 85 to be used as search keyword (arrow 101). The URL server 5 searches a database 15 to see whether the same symbol as the received symbol 103 exists therein, and if it finds such a symbol (e.g., 105B) it reads a URL 107B corresponding thereto from the database 15 (arrow 108), and returns this URL 109 which it has read to the linker 23 (arrow 111). The linker 23 passes the URL 95 received from the server 5 to the WWW browser 21 (arrow 97). Furthermore, the linker 23 stores the symbol 85 it sent to the server 5 and the URL 95 it received from the server 5 in its cache file 87 such that the two are mutually linked therein (arrows 113 and 115).

Furthermore, in the case where a symbol 75 is passed to the linker by dragging and dropping it thereon from a certain application, say a word processor 71, the situation will be as follows. While a symbol 75 within the memory area of the word processor 71 is being dragged, that symbol 75 remains under the management of the operating system, as indicated by the broken line 117 in the drawing. Then, if this symbol 75 which is being dragged is, for example, dropped onto the icon of the linker 23, the linker 23 will copy that symbol 75 into its own memory area, capturing it therein (arrow 119). Processing after capture of the symbol is similar to the aforementioned case in which the symbol is captured from the clipboard 79.

In addition, the linker 23 also monitors typed input from the keyboard to see whether a symbol is entered in place of a URL at the "Address:" or "Location:" or other such input field for entry of the site to be accessed by the WWW browser 21. That is, the linker 23 monitors the route (arrow 123) by way of which a symbol entered from the keyboard 121 would be passed by the operating system to the WWW browser 21, capturing any such entered symbol therefrom (arrow 127). Moreover, determination of whether the typed text input is a symbol or a URL may be accomplished by, for example, evaluating whether the text in question matches the prescribed format of a URL, and assuming it is a URL if it does match that format and assuming it is a symbol if it does not. Operations after capture of the symbol are similar to the corresponding operations described above.

Figure 4:
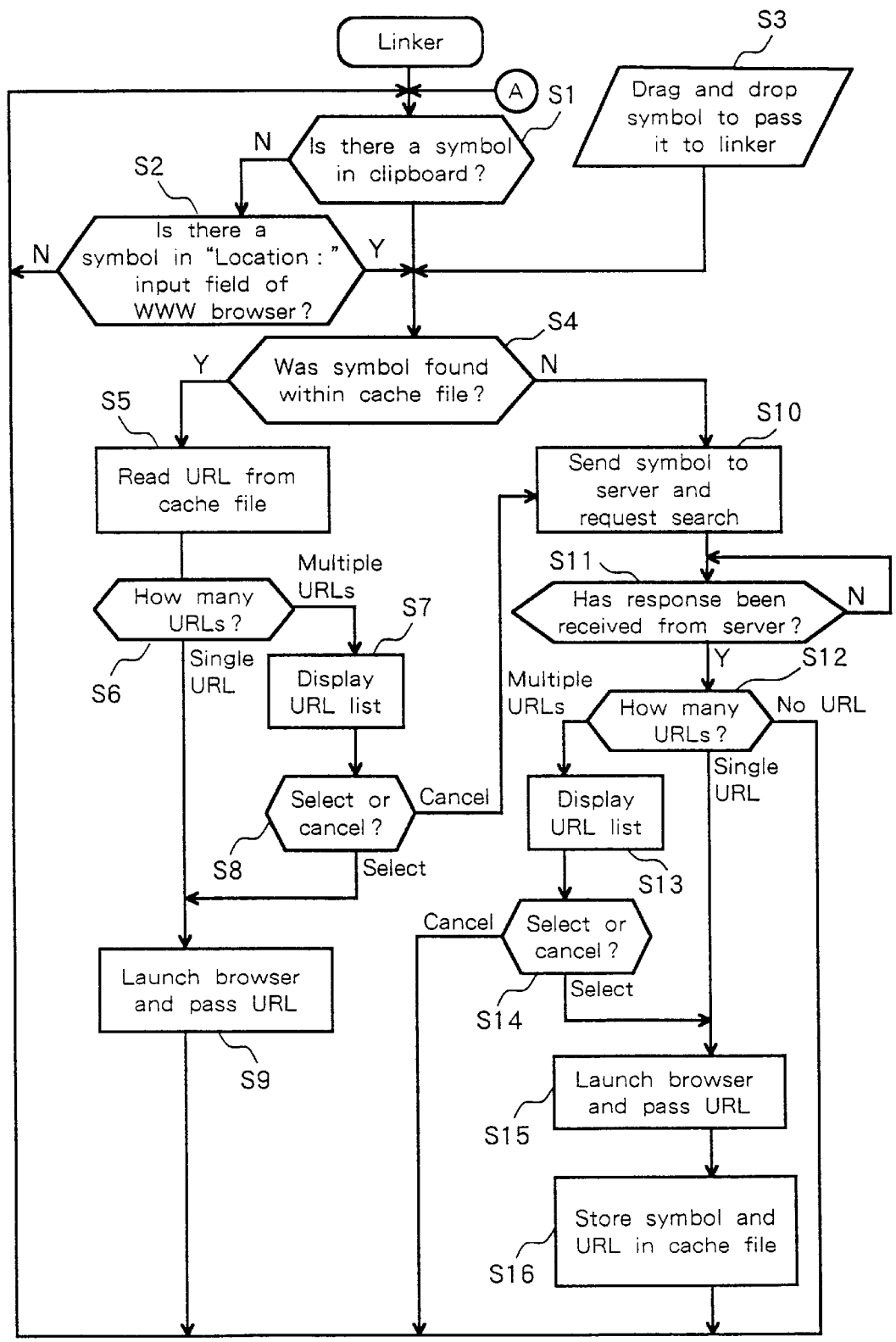
FIG. 4 is a flowchart showing processes occurring at a linker 23.

FIG. 4 is flowchart showing processes occurring at a linker 23.

The linker 23 checks at regular intervals to see whether there is a symbol in the clipboard S1). Furthermore, the linker 23 also checks, as described above, to see whether a symbol has been typed in at the "Address:" or "Location:" or other such input field for entry of the site to be accessed by the WWW browser 21 (S2). If the result of either check is a YES, the linker 23 captures that symbol, and then first searches its cache file 87 to see whether the same symbol as the captured symbol is contained therein (S4). Furthermore, in the event that the symbol has been passed to the linker 23 by dragging and dropping thereof from another application (S3), the linker 23 likewise proceeds to step S4.

At step S4, if the symbol in question is found in the cache file 87, the linker 23 reads all URLs corresponding to that symbol from the cache file 87 (S5). Then, in the event that only one URL was read therefrom, the linker 23 issues a command to launch a WWW browser 21, passing this URL which was read to the WWW browser 21. In the event that a plurality of URLs were read from the cache file 87, a list of this plurality of URLs which were read is displayed at the display of the man-machine interface (S7) so as to allow the user to choose one URL therefrom. Upon selection by the user of one URL from that list (S8), the linker 23 proceeds to step S9 and passes that URL to the WWW browser 21. In the event that the user does not select a URL from the list (e.g., the user selects "cancel" or the like), the linker 23 proceeds to step S10, to be described below.

At the aforementioned step S4, if the symbol in question is not found in the cache file 87, the linker 23 sends a request to search for that symbol to the URL server 5 (S10), and awaits the response of the URL server 5 and the results of the search performed thereat (S1). Upon receiving the response of the URL server 5 and the results of the search performed thereat, the linker 23, in the event that those search results contain only one URL, issues a command to launch a WWW browser 21, passing this URL to the WWW browser 21 (S15). On the other hand, if those search results contain a plurality of URLs, a list of this plurality of URLs is displayed at the display of the man-machine interface (S14) so as to allow the user to choose one URL therefrom. Upon selection by the user of one URL from that list, the linker 23 proceeds to step S15 and passes that URL to the WWW browser 21. In the event that the user does not select a URL from the list (e.g., the user selects "cancel" or the like), the linker 23 does nothing further and instead returns to the first step, step S1. Likewise, in the event that no URL is contained in the response from the URL server 5, the linker 23 in this case also does nothing further and instead returns to the first step, step Si (an error message to the effect that a site corresponding to the symbol in question was not found may also be displayed at this time).

When a URL is sent to the WWW browser 21 at step S15, the linker 23, in addition, writes the set comprising that symbol and that URL to its cache file 87 (S16), and returns to the first step, step Si.

Figure 5:
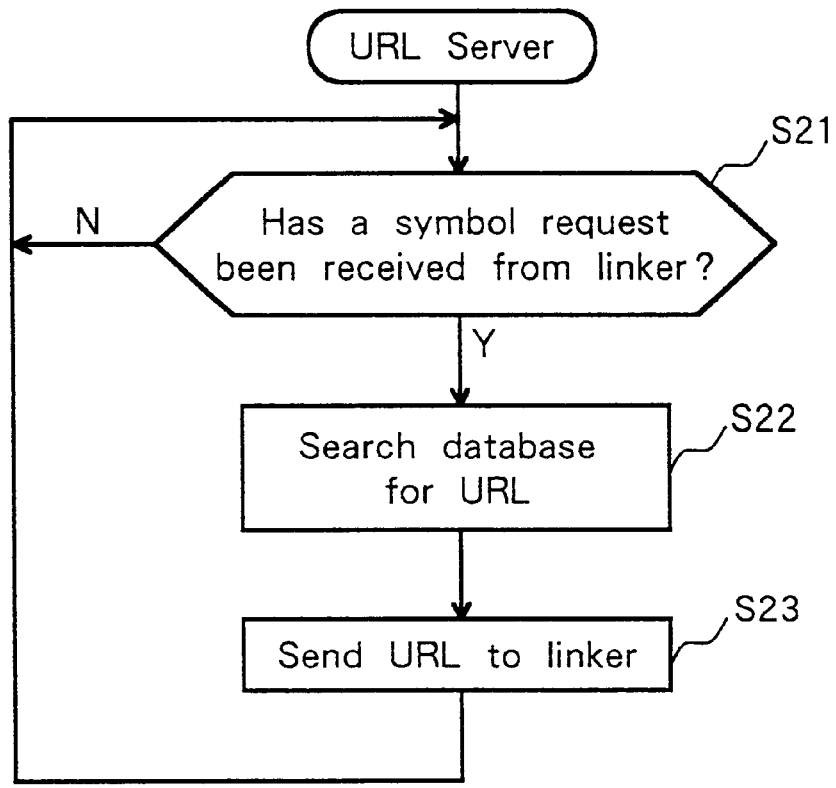
FIG. 5 is a flowchart showing processes occurring at a URL server 5.

FIG. 5 is flowchart showing processes occurring at a URL server 5.

Upon receiving a request to search for a symbol from the linker 23 (S21), the URL server 5 searches a database 15 for that symbol (S22), and if the symbol in question is found therein, reads from the database 15 all URLs corresponding thereto and returns these as search results to the linker 23 (S23). If the symbol is not found in the database 15, a response to the effect that there were no "hits" (i.e., matches) is returned thereto instead (S23).

When there are a plurality of URLs corresponding to a single symbol, the URL server 5 can, instead of returning that plurality of URLs to the linker 23, also proceed as follows. To wit, it can prepare in advance a single-page website containing a list of that plurality of URUs, with hypertext markup language (hereinafter "HTML") links to those URLs, and can set the URL of that URL list page in correspondence to that symbol and store this in the database 15. Accordingly, the URL server 5 can then return the URL of this URL list page as results of the search for that symbol. As a result, because that URL list page will then be displayed at the WWW browser 21, the user can easily "jump to" (i.e., access) the desired URL from that page.

In the embodiment described above, the URL server 5, as shown in FIG. 3, only sends URLs 109 to the linker 23. However, as a variation on this embodiment, the URL server 5 may send sets comprising symbols 103 and URLs 109 to the linker 23, in which case the linker 23 need only store in its cache file 87 the sets of symbols 103 and URLs 109 received from the URL server 5 (i.e., writing of the symbol 85 by the linker as indicated by arrow 113 in FIG. 3 becomes superfluous).

Figure 6:
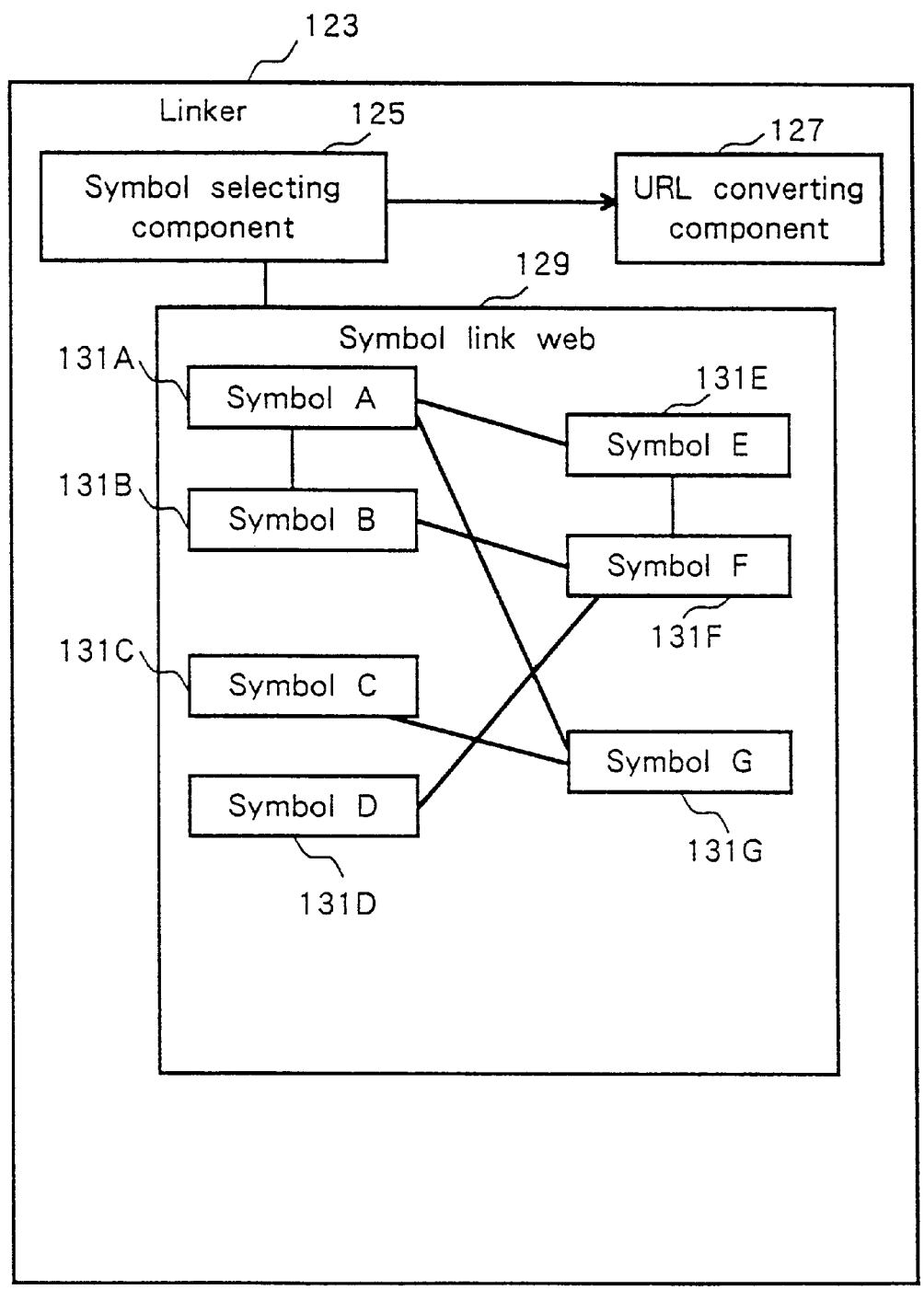
FIG. 6 is a drawing showing another embodiment of a linker.

FIG. 6 shows a linker 123 associated with another embodiment of the present invention.

The linker 123 shown in FIG. 6 possesses a symbol selecting component 125 and a URL converting component 127 as executable modules. The symbol selecting component 125 possesses a symbol link web 129 comprising a variety of symbols 131A, 131B, . . . freely set and freely mutually linked by the user. The symbol selecting component 125 carries out processing for the purpose of allowing selection of a desired symbol as the user freely travels from link to link within the symbol link web 129. Furthermore, the URL converting component 127 receives symbols selected by the user from the symbol selecting component 125, and performs processing similar to that at step S4 and thereafter in FIG. 4.

Figure 7:
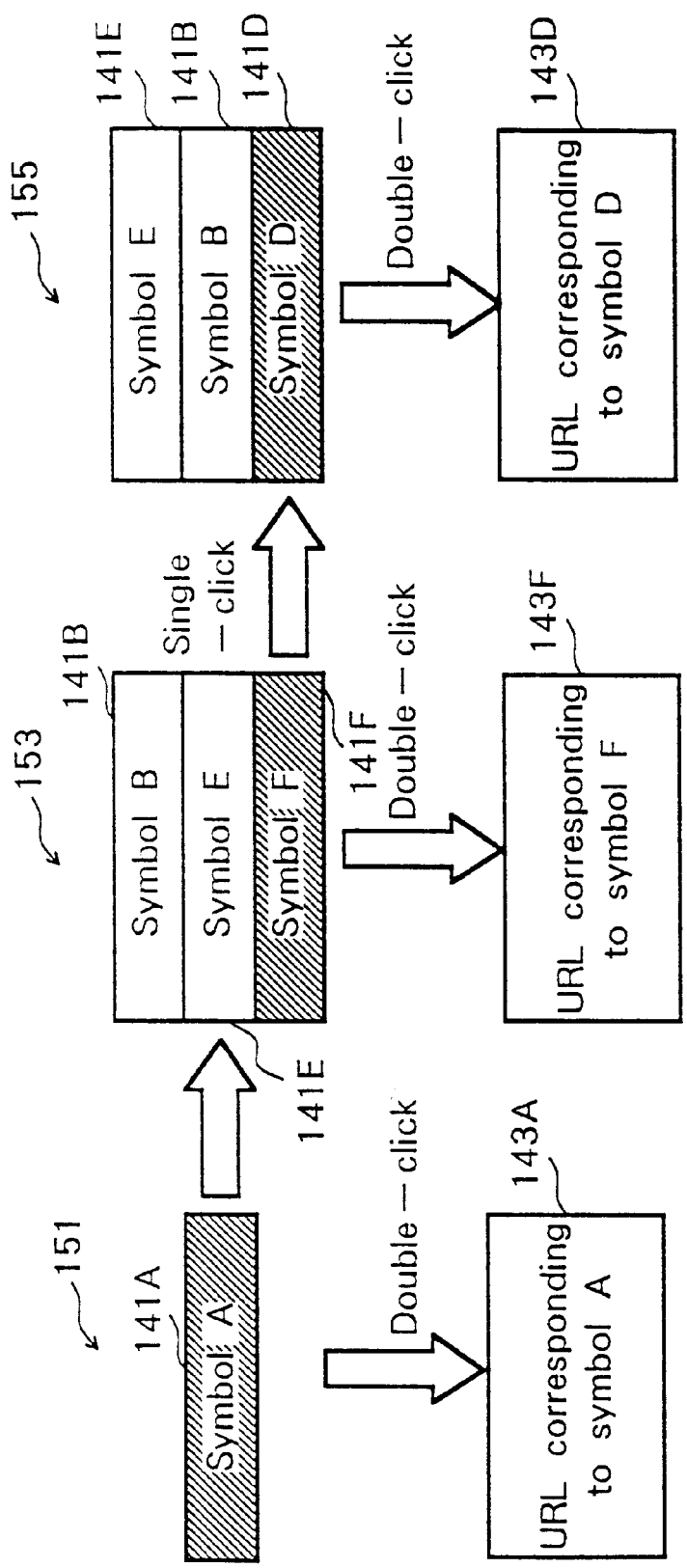
FIG. 7 is a drawing for explaining a sample display that might be displayed by a symbol selecting component 125 as a user is selecting symbols while traveling along the links of a symbol link web 129.

FIG. 7 shows a sample display that might be displayed by the symbol selecting component 125 as the user is selecting symbols while traveling along the links of the symbol link web 129.

When the user passes, let us say, "SYMBOL A" to the linker 123 by copying via clipboard, dragging and dropping, or the like from a certain application, the symbol selecting component 125 of the linker 123 displays "SYMBOL A" 141A as shown at display 151 at the left edge of FIG. 7. Next, if the user double-clicks on (i.e., to indicate approval and okay selection of) this "SYMBOL A" 141A appearing at display 151, the symbol selecting component 125 passes "SYMBOL A" 141A to the URL converting component 127, and so "SYMBOL A" 141A is converted into a corresponding URL 143A and this is passed to a WWW browser.

On the other hand, if the user single-clicks on (i.e., to indicate he wants to look at other candidates linked via the symbol link web to) "SYMBOL A" 141A appearing at display 151, the symbol selecting component 125 accesses the symbol link web 129 and reads all of the symbols linked to "SYMBOL A" 141A, displaying these at display 153. Accordingly, a list comprising "SYMBOL B" 141B, "SYMBOL E" 141E, and "SYMBOL F" 141F are displayed at display 153. Upon double-clicking on, let us say, "SYMBOL F" 141F in this list, this "SYMBOL F" 141F is converted into a corresponding URL 143F and this is passed to a WWW browser. However, if the user single-clicks on "SYMBOL F" 141F, a list of the symbols linked to that "SYMBOL F" 141F; i.e., "SYMBOL E" 141E, "SYMBOL B" 141B, and "SYMBOL D" 141D; are displayed at the display 155 that is displayed next.

The user can thus utilize a symbol link web 129 which he has constructed himself to find and select the desired symbol as he traverses the links among the symbols of the symbol link web 129. There are a variety of conceivable uses to which this capability may be put.

One such use is to assist human memory. For example, let us suppose a user accesses the website of a certain mail-order house and finds there a catalogue containing a shoulder bag in which he is interested, but which he decides not to buy right away. At that time, thinking that he might want to purchase the shoulder bag at some date in the future, he enters the name of the mall-order house and the phrase "shoulder bag" into the symbol link web 129 such that they are linked together therein. Upon so doing, should he decide at some later time that he really does want to buy the shoulder bag, even if he is unable to remember the name of the mail-order house, because entry of the phrase "shoulder bag" and the passing thereof to the linker will cause display of a list of symbols linked to the phrase "shoulder bag", he will be able to find the name of the mail-order house in the list, and by double-clicking thereon he will once again be able to access the website of that mail-order house.

Or, another such use is to allow the user to customize symbols. That is, it could well be the case that the symbols allowed to be passed to a URL server are not symbols defined by individual users but symbols defined by the URL server. In such a case, in the event that an individual user does not care for the symbols that happen to have been defined for him by the URL server, he may instead wish to use symbols that he himself has defined. To do this, he enters a symbol that he himself has defined and a symbol that has been defined by the URL server into the symbol link web 129 such that they are linked together therein, as a result of which it will then be possible for him to use the symbol that he himself has defined.

Figure 8:
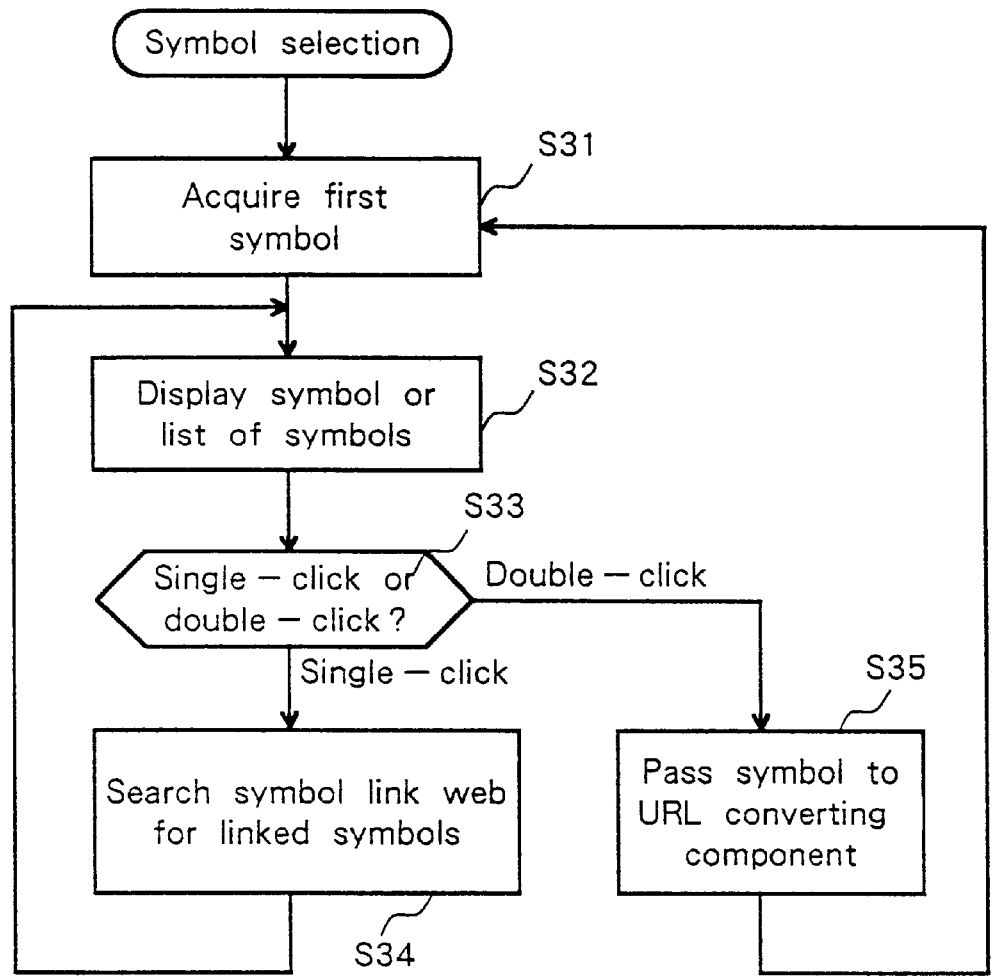
FIG. 8 is a flowchart showing processes occurring at a symbol selecting component 125.

FIG. 8 is flowchart showing processes occurring at a symbol selecting component 125.

The symbol selecting component 125 first acquires a symbol at steps S1, S2, or S3 in FIG. 4 (S31), and the acquired symbol is displayed (S32). If the user then single-clicks on the displayed symbol (S33), the symbol selecting component 125 searches the symbol link web 129 for other symbols linked to that symbol (S34), and displays any symbol or symbols retrieved therefrom (i.e., displaying a list in the event that there is more than one) (S32). On the other hand, if the user double-clicks on the displayed symbol (S33), the symbol selecting component 125 passes that symbol to the URL converting component 127 (S35).

Figure 9:
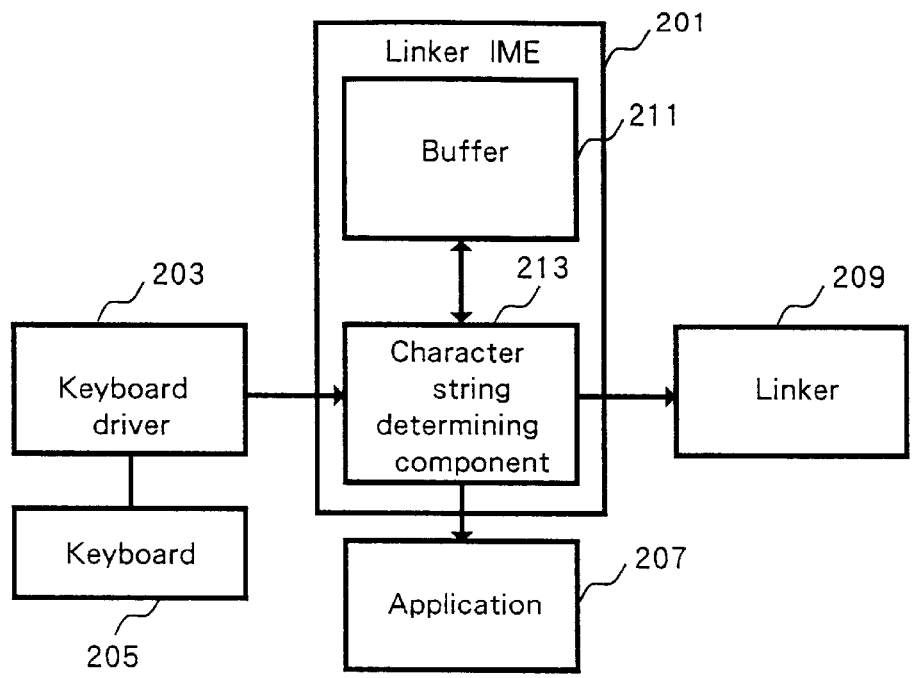
FIG. 9 is a block diagram showing another embodiment wherein an IME is employed to pass a character string entered by a user to a linker.
Figure 10:
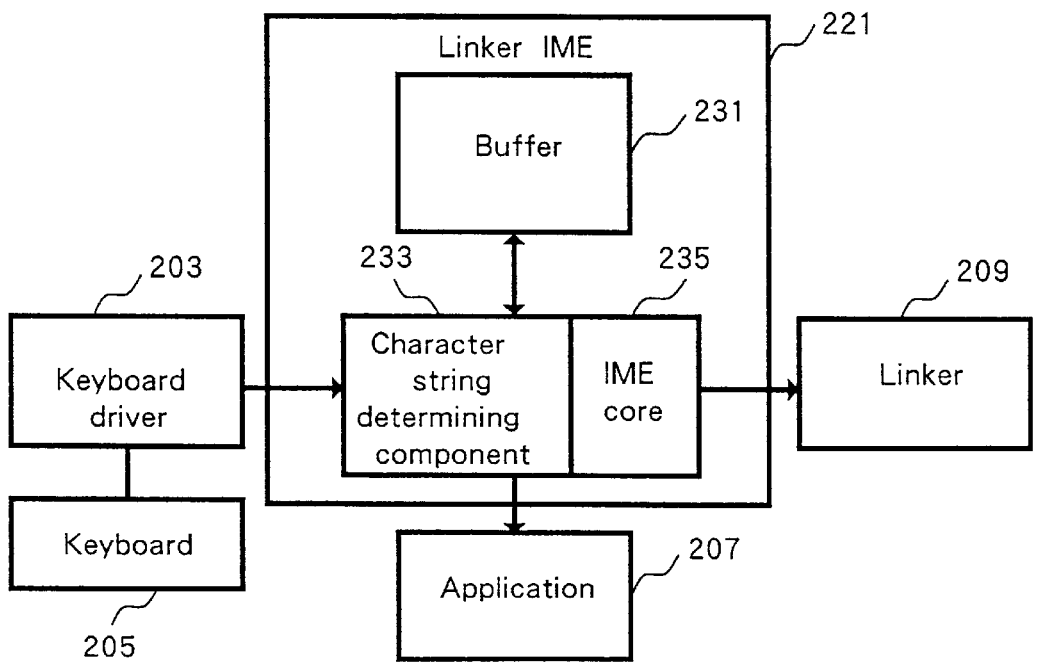
FIG. 10 is a block diagram showing yet another embodiment wherein an IME is employed to pass a character string entered by a user to a linker.

FIG. 9 and FIG. 10 show two other embodiments wherein a character string entered by a user is passed to a linker as a symbol.

In these embodiments, a character string entered by a user from a keyboard is passed to a linker by way of an input method editor (hereinafter "IME"), a type of program module that functions as an intermediary, carrying out conversion of the character string entered by the user when necessary (e.g., in the case of entry of Japanese-language characters, by carrying out conversion from hiragana or katakana syllabary characters to kanji ideograms) before passing it to an application. In particular, a client computer in the embodiment shown in FIG. 9 possesses a linker IME 201 that is specially designed for the linker 209. On the other hand, in the embodiment shown in FIG. 10, a client computer possesses a linker IME 221 comprising IME modules 231, 235, similar in function to corresponding elements in a conventional IME, but with, in addition, a character string determining component 233 that has been incorporated therein for use with the linker. Whereas the embodiment of FIG. 9 is suitable for handling single-byte encoded characters (e.g., ASCII-encoded text characters, etc.), the embodiment of FIG. 10 is suitable for handling double-byte encoded characters (e.g., JIS-encoded text characters, JIS being a character encoding scheme similar in concept to ASCII, but using double-byte encoding instead of single-byte encoding so as to accommodate the larger character set required for the Japanese language).

In the embodiment shown at FIG. 9, the linker IME 201 possesses a character string determining component 213 and a buffer 211, wherein character strings are stored prior to and during conversion. When the user presses a key or key sequence at a keyboard 205, the character (here and below, "character" is used in its most generic sense and should be understood to include alphanumeric characters as well as symbols, etc.) or command mapped to the pressed key or key sequence, as determined by the IME specifications of the operating system, is input to the character string determining component 213 of the linker IME 201 by way of a keyboard driver 203. The character string determining component 213 then performs the following operations in response to the input character or command.

(1) In the Event that an Ordinary Alphanumeric, Symbol, or Like Character Key is Pressed The character string determining component 213 appends the character input by the pressing of an ordinary alphanumeric, symbol, or like character key to the contents of the buffer, and at the same time forwards this character to the currently active application 207 (e.g., word processor or spreadsheet software, etc.) such that it is displayed there underlined, in reverse video, shaded, blinking, in a distinctive color, or the like. As a result, the input character is displayed in temporary fashion at the application 207.

(2) In the Event that the ESC Key is Pressed

In response to the command from the ESC key, the character string determining component 213 clears the buffer 211 (i.e., erases the contents thereof) if it contains any character or characters, and at the same time terminates display of any character or characters currently being displayed in temporary fashion (and therefore underlined, in reverse video, shaded, blinking, in a distinctive color, or the like) at the application 207 (i.e., input of temporarily displayed characters is canceled). If the buffer 211 was empty, the character string determining component 213 instead performs the function assigned to the BACKSPACE key in the application 207 in question.

(3) In the Event that the OKAY Key (e.g., the ENTER Key) is Pressed

In response to the command from the OKAY key, the character string determining component 213, if the buffer 211 contains any character or characters, terminates display of any character or characters currently being displayed in temporary fashion at the application 207, and then copies the contents of the buffer 211 to the application 207 and clears the buffer 211 (i.e., simple input of character or characters to the application 207).

(4) In the Event that the LINK Key (this may be Defined in Software as, for Example, the Alt+L Key Sequence, or a Special LINK Key may be Provided on the Keyboard) is Pressed In response to the command from the LINK key, the character string determining component 213 copies the contents of the buffer 211 to the linker 209 and clears the buffer 211, upon which the linker 209 carries out operations wherein the received characters are converted to URLs, Internet access is made possible, and so forth, as has already been described.

(5) In the Event that the LINK and OKAY Keys are Pressed

In response to the commands from the LINK and OKAY keys, the character string Determining Component 213, if the Buffer 211 Contains any Character or Characters, terminates display of any character or characters currently being displayed in temporary fashion at the application 207, and then copies the contents of the buffer 211 to the application 207 and in addition copies the contents of the buffer 211 to the linker 209, and clears the buffer 211 (i.e., both functions, simple input of character or characters to the application 207 and operation of the linker 209, occur together).

In the embodiment shown at FIG. 10, the linker IME 221, in addition to being equipped with an IME core 235 and a buffer 231, these being similar in function to corresponding elements in a conventional IME, possesses a character string determining component 233 that has been specially designed for use with the linker 209. When the user presses a key or key sequence at a keyboard 205, the character or command mapped to the pressed key, as determined by the IME specifications of the operating system, is input to the character string determining component 233 of the linker IME 221 by way of a keyboard driver 203. The character string determining component 233 passes the character or command to the IME core 235 for processing, while it at the same time monitors for recognition of any assigned key input that would cause launching of the linker 209 (e.g., the LINK key), and if such key input is recognized, regardless of whether such recognition occurs prior to conversion or during conversion, the contents of the buffer 231 are immediately passed to the linker 209. When a key or key sequence other than a key or key sequence assigned to launch the linker 209 is pressed, the character string determining component 233 merely passes the input character or command to the IME core 235 for processing, in which case operation of the linker IME 221 will therefore be substantially the same as operation of a conventional IME. Taking input of Japanese characters as a specific example, operation of the character string determining component 233 is as described below.

(1) In the Event that an Ordinary Alphanumeric, Symbol, or Like Character Key is Pressed The character string determining component 233 passes the input character to the IME core 235 for processing. At the IME core 235, when keyboard input is set for romaji (a system of transliterating Japanese hiragana and katakana syllabary characters into roman, or standard alphabetic, letters) input, the character string is automatically converted to hiragana or katakana characters, as the case may be, based on the combination of entered alphabetic characters, and the converted hiragana or katakana character or characters are appended to the contents of the buffer 231, and at the same time these hiragana or katakana characters are forwarded to the currently active application 207 such that they are displayed there underlined, in reverse video, shaded, blinking, in a distinctive color, or the like. As a result, the input character or characters are displayed in temporary fashion at the application 207.

(2) In the Event that the OKAY Key (e.g., the ENTER Key) is Pressed

The character string determining component 233 passes the command from the OKAY key to the IME core 235 for processing. The IME core 235 consults its internal kanji ideogram dictionary, obtains therefrom a candidate character string or strings into which the character string within the buffer 231 might be converted, and overwrites the contents of the buffer 231 with these. At the same time, the IME core 235 forwards these same candidate character strings to the currently active application 207 such that they are displayed there underlined, in reverse video, shaded, blinking, in a distinctive color, or the like. As a result, the candidate character strings are displayed in temporary fashion at the application 207.

(3) In the Event that the ESC Key is Pressed

The character string determining component 233 passes the command from the ESC key to the IME core 235 for processing. The IME core 235 carries out operations similar to those carried out by the character string determining component 213 shown in FIG. 9. Note, however, that some conventional IMEs may, upon receipt of a command from the ESC key, cancel the conversion candidates within the buffer 231 and instead go back to display of the original hiragana or katakana characters.

(4) In the Event that the LINK Key (this may be Defined in Software as, for Example, the Alt+L Key Sequence, or a Special LINK Key may be Provided on the Keyboard) is Pressed In response to the command from the LINK key, the character string determining component 233 copies the contents of the buffer 231 to the linker 209 and clears the buffer 211, upon which the linker 209 carries out operations wherein the received characters are converted to URLs, Internet access is made possible, and so forth, as has already been described.

(5) In the Event that the LINK and OKAY Keys are Pressed

The character string determining component 233 passes the command from the OKAY key to the IME core 235 for processing; and at the same time, in response to the command from the LINK key, copies the contents of the buffer 231 to the linker 209.

Below, we describe concrete examples of methodologies for representation of character strings being entered into a linker employing an IME as described above.

1. Methodologies for Representing Selected Character Strings

Taking the example of a "Windows" environment, the possible methodologies for representing selected character strings, i.e. for indicating that a character string is ready to be passed to the linker, during use of an IME can be broadly divided into two categories, as follows.

<1> Highlighting the Selected Character String Using Reverse Video or the Like <2> Underlining the Selected Character String Using a Solid Line or a Dashed Line In the specific examples presented below, entered characters are enclosed in quotation marks "", and the portions thereof that are currently selected (i.e., that would be highlighted or underlined on the display) are enclosed in square brackets [ ].

2. Procedure for Entering Single-byte Encoded Characters as at the Embodiment Shown in FIG. 9

2-1. Launching the Linker Directly from the Desktop (i.e., not Indirectly from Some Other Application)

<1> The linker IME is loaded into random-access memory (hereinafter "RAM"). This may be accomplished as a result of its having been loaded as a terminate-and-stay-resident-type (hereinafter "TSR") program, or as a result of its having previously been launched in a multitasking environment, etc., but in this example we will assume that it has been loaded as a TSR program. (Of course, the functionality of the linker may also be written into the operating system code, or it may be incorporated into hardware or firmware; what matters is that it is active.) If this has been done, under the current specifications of the Japanese version of "Windows" the icon of the linker IME will be displayed together with the icons of any other TSR programs in an area called the task tray, which is located in the lower right corner of the display (near the time display).

<2> With the cursor at any location on the display that will allow entry of typed input, type in the character string to be passed to the linker.

EXAMPLE 1

"[SOFMAP]"

<3> After entering the text shown above, press Alt+Z or an equivalent key sequence assigned to represent the LINK key. Alternatively, the mouse can be used to select the icon of the linker. The linker launches with the selected character string being passed thereto, this character string is converted to a URL, a browser is launched with this URL being passed thereto, and the website at that URL is accessed. If the LINK key possesses the additional function of okaying the character string, okaying of the character string can be carried out simultaneously.

EXAMPLE 1-1

When the LINK Key Only Possesses the Function of Launching the Linker

"[SOFMAP]"

Result: The SOFMAP website is accessed.

EXAMPLE 1-2

When the LINK Key also Functions as an OKAY Key "SOFMAP"

Result: The SOFMAP website is accessed.

2-2. Launching the Linker while Entering Text at a Word Processor or Other Application <1> Again, we take the case where the linker IME is loaded into RAM as a TSR program. If this has been done, under the current specifications of the Japanese version of "Windows" the icon of the linker IME will be displayed together with the icons of any other TSR programs in an area called the task tray, which is located in the lower right corner of the display.

<2> Type in characters as you normally would. At this time, all characters in the entered string will be selected.

EXAMPLE

"[The Company]"

<3> Immediately prior to reaching the character string to be passed to the linker, press the ENTER key to okay the text typed in up to that point.

EXAMPLE

"[The Company is]"

(Press the ENTER key)

The "Company is"

<4> Type in the character string to be passed to the linker.

EXAMPLE 2

"The Company is [SOFMAP]"

<5> After entering the text shown above, press Alt+Z or an equivalent key sequence assigned to represent the LINK key. Alternatively, the mouse can be used to select the icon of the linker. The linker launches with the selected character string being passed thereto, this character string is converted to a URL, a browser is launched with this URL being passed thereto, and the website at that URL is accessed. If the LINK key possesses the additional function of okaying the character string, okaying of the character string can be carried out simultaneously.

EXAMPLE 2-1

When the LINK key Only Possesses the Function of Launching the Linker

"The Company is [SOFMAP]"

Result: The SOFMAP website is accessed.

EXAMPLE 2-2

When the LINK Key also Functions as an OKAY Key

"The Company is SOFMAP"

Result: The SOFMAP website is accessed.

3. Procedure for Entering Double-byte Encoded Characters as at the Embodiment Shown in FIG. 10

21 1> Again, we take the case where the linker IME (equivalent to a front end processor; hereinafter "FEP") is loaded into RAM as a TSR program. If this has been done, under the current specifications of the Japanese version of "Windows" the icon of the linker IME will be displayed together with the icons of any other TSR programs in an area called the task tray, which is located in the lower right corner of the display.

<2> With the cursor at any location on the display that will allow entry of typed input, type in the character string to be passed to the linker. Upon so doing, the FEP functions so as to automatically convert alphabetic characters to hiragana (or katakana) characters, displaying these as it does so.

EXAMPLE 3

Figure 17:
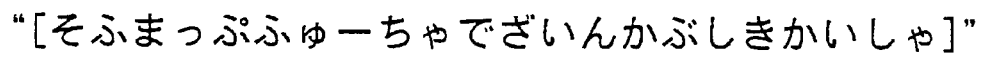

Character entry and display thereof are as shown at FIG. 17.

<3> After entering the text indicated, press Alt+Z or an equivalent key sequence assigned to represent the LINK key. Alternatively, the mouse can be used to select the icon of the linker. In either case, the linker launches with the selected character string being passed thereto, this character string is converted to a URL, a browser is launched with this URL being passed thereto, and the website at that URL is accessed. If the LINK key possesses the additional function of okaying the character string, okaying of the character string can be carried out simultaneously.

EXAMPLE 3-1

When the LINK key Only Possesses the Function of Launching the Linker

Figure 18:
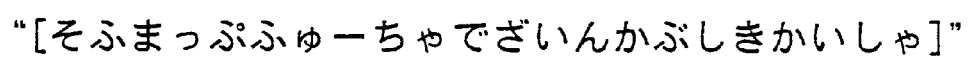

Character entry and display thereof are as shown at FIG. 18.

Result: The Sofmap Future Design website is accessed if such a website exists.

EXAMPLE 3-2

When the LINK Key also Functions as an OKAY Key

Character entry and display thereof are as shown at FIG. 19.

Result: The Sofmap Future Design website is accessed if such a website exists.

<4> In the event that no URL is assigned to the hiragana/katakana syllabary character string shown at FIG. 20, the user presses the SPACE key or an equivalent key sequence assigned to represent syllabary-ideogram conversion, causing the FEP to carry out conversion between hiragana/katakana syllabary characters and kanji ideogram characters. During the process of syllabary-ideogram character conversion, the user can cause any number of permutations of alternative conversion candidates to be displayed until he obtains the desired character string.

EXAMPLE 4

Character entry and display thereof are as shown at FIG. 21.

(Press the SPACE key)

Character entry and display thereof are as shown at FIG. 22.

(Press the SPACE key)

Character entry and display thereof are as shown at FIG. 23. (As shown, long character strings may be automatically broken up into a number of conversion candidates by the FEP.)

<5> When the character string you want to select (e.g., the character string shown at FIG. 24) is displayed as a conversion candidate, press Alt+Z or an equivalent key sequence assigned to represent the LINK key. Alternatively, the mouse can be used to select the icon of the linker. In either case, the linker launches with the selected conversion candidate character string being passed thereto, this character string is converted to a URL, a browser is launched with this URL being passed thereto, and the website at that URL is accessed. If the LINK key possesses the additional function of okaying the character string, okaying of the character string can be carried out simultaneously.

EXAMPLE 4-1

When the LINK Key Only Possesses the Function of Launching the Linker

Character entry and display thereof are as shown at FIG. 25.

Result: The Sofmap Future Design website is accessed if such a website exists.

EXAMPLE 4-2

When the LINK Key also Functions as an OKAY Key

Character entry and display thereof are as shown at FIG. 26.

Result: The Sofmap Future Design website is accessed if such a website exists.

3-1. Launching the Linker While Entering Text at a Word Processor or Other Application <1> Again, we take the case where the linker IME (FEP) is loaded into RAM as a TSR program. If this has been done, under the current specifications of the Japanese version of "Windows" the icon of the linker IME will be displayed together with the icons of any other TSR programs in an area called the task tray, which is located in the lower right corner of the display.

<2> Type in characters as you normally would. At this time, the FEP will operate so as to automatically convert all characters in the entered string to hiragana (or katakana) syllabary characters, selecting (i.e., highlighting, etc.) them as they are displayed.

EXAMPLE 5

Character entry and display thereof are as shown at FIG. 27.

<3> Create text as usual using the syllabary-ideogram conversion capability of the FEP, converting some entered characters to kanji ideogram characters and some entered characters to hiragana syllabary characters, as the case may be. Immediately prior to reaching the character string to be passed to the linker, press the ENTER key to okay the text typed in up to that point.

EXAMPLE 6

Figures 28, 29, 30:
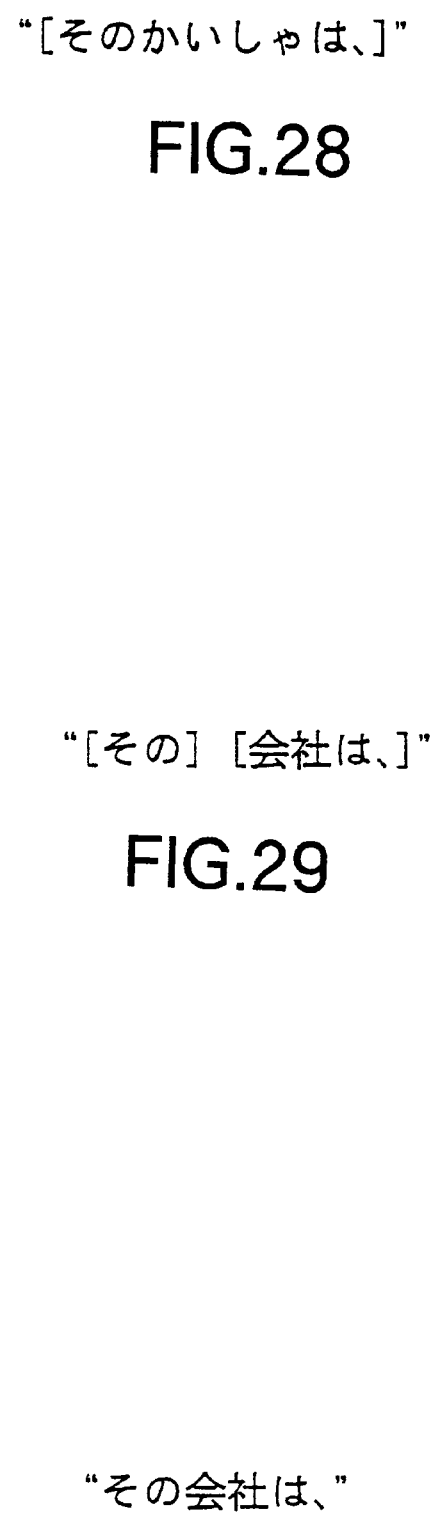

Character entry and display thereof are as shown at FIG. 28.

(Press the SPACE key)

Character entry and display thereof are as shown at FIG. 29.

(Press the ENTER key)

Character entry and display thereof are as shown at FIG. 30.

<4> Continue by typing in the character string to be passed to the linker. The FEP functions so as to automatically convert alphabetic characters to hiragana (or katakana), characters, displaying these as it does so.

EXAMPLE 7

Character entry and display thereof are as shown at FIG. 31.

<5> After entering the text indicated, press Alt+Z or an equivalent key sequence assigned to represent the LINK key. Alternatively, the mouse can be used to select the icon of the linker. The character string is converted to a URL, a browser is launched with this URL being passed thereto, and the website at that URL is accessed. If the LINK key possesses the additional function of okaying the character string, okaying of the character string can be carried out simultaneously. In the event that no URL is assigned to the hiragana/katakana syllabary character string shown at FIG. 31, the user presses the SPACE key or an equivalent key sequence assigned to represent syllabary-ideogram conversion, causing the FEP to carry out conversion between hiragana/katakana syllabary characters and kanji ideogram characters. During the process of syllabary-ideogram character conversion, the user can cause any number of permutations of alternative conversion candidates to be displayed until he obtains the desired character string.

EXAMPLE 8

Character entry and display thereof are as shown at FIG. 32.

(Press the SPACE key)

Character entry and display thereof are as shown at FIG. 33.

(Press the SPACE key)

Character entry and display thereof are as shown at FIG. 34.

<6> When the character string you want to select, e.g. the character string shown at FIG. 35, is displayed as a conversion candidate, press a key sequence assigned to launch the linker or use the mouse to select the icon thereof In either case, the linker launches with the selected conversion candidate character string being passed thereto, this character string is converted to a URL, a browser is launched with this URL being passed thereto, and the website at that URL is accessed. If the LINK key possesses the additional function of okaying the character string, okaying of the character string can be carried out simultaneously.

EXAMPLE 8-1

When the LINK Key Only Possesses the Function of Launching the Linker

Character entry and display thereof are as shown at FIG. 36.

Result: The Sofmap Future Design website is accessed if such a website exists.

EXAMPLE 8-2

Figure 37:
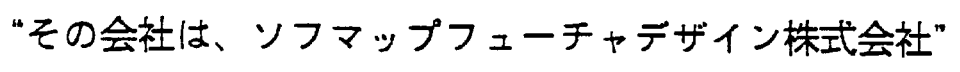

When the LINK Key also Functions as an OKAY Key Character Entry and Display thereof are as Shown at FIG. 37.

Result: The Sofmap Future Design website is accessed if such a website exists.

Figure 11:
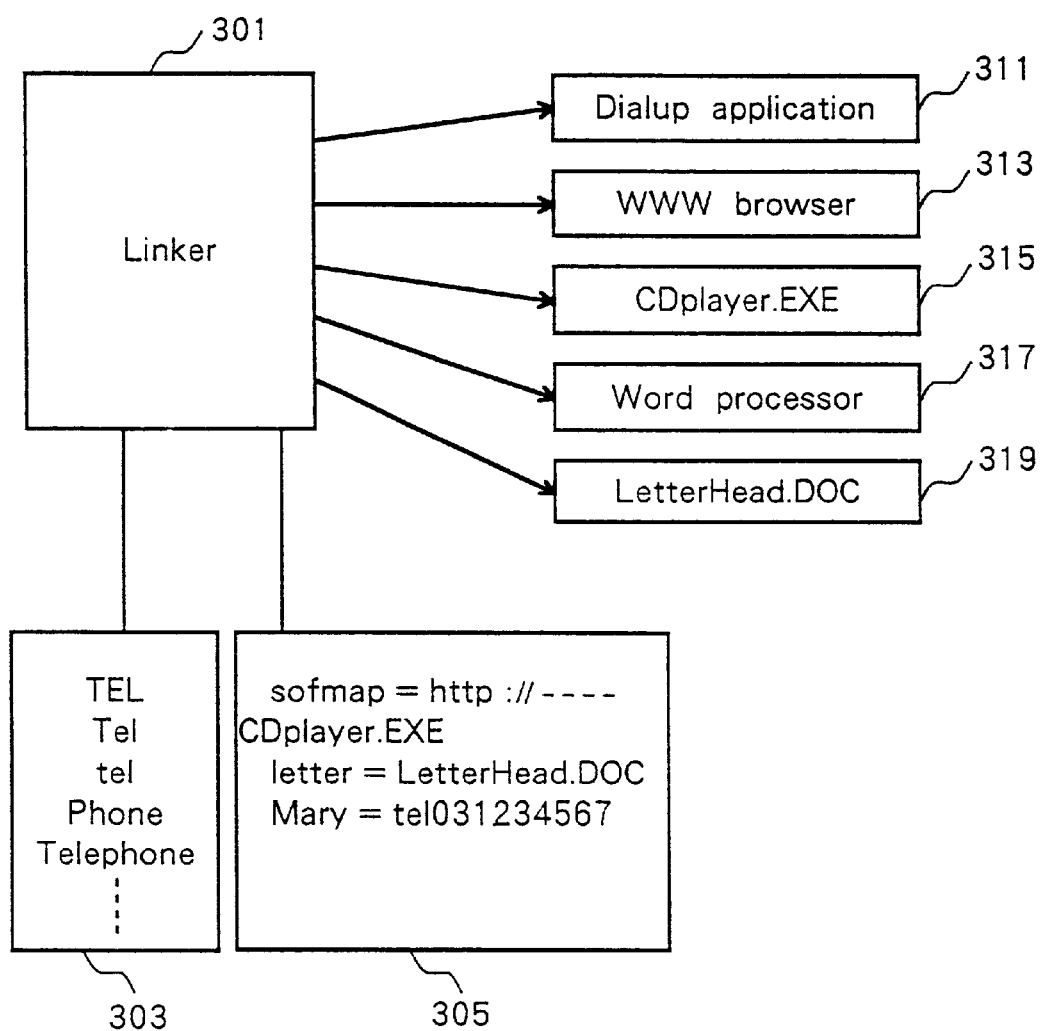
FIG. 11 is a block diagram showing yet another embodiment of a linker.

FIG. 11 shows yet another embodiment of a linker.

The linker 301 resides on a client computer and possesses a telephone word lookup table 303 and a text-action lookup table 305. Stored within the telephone word lookup table 303 are a plurality of keywords (e.g., mnemonics easily remembered by the user) of the sort that might typically be employed to indicate telephone numbers. Stored within the text-action lookup table 305 are various text strings (in the example shown in the drawing, "sofmap", "cd", "letter", "Mary", etc.) together with actions that are linked thereto (in the drawing, these links are indicated by equal signs). Here, "actions" specify tasks to be executed by the client computer. For example, in the example shown at FIG. 11, a URL such as "http:// . . . " is an action specifying that the website indicated by that URL should be accessed, the name of a file containing an executable program such as "CDplayer.EXE" is an action specifying that the program in question should be executed, the name of a data file (as used here, a "data" file is any non-executable file, this term not being meant to exclude files containing ASCII or other such data representations of text such as "LetterHead.DOC" is an action specifying that the data file in question should be opened, and a telephone number such as "te1031234567" is an action specifying that the telephone number in question should be dialed.

In addition to the linker 301, there are also a number of files 311, 313, 315, 317, 319 at the client computer. In the example shown at FIG. 11, file 311 is a dialup application for dialing a telephone number, file 313 is a WWW browser, file 315 is an application for playing an audio compact disc (hereinafter "audio CD") that has been loaded into the client computer's CD-ROM drive, file 317 is a word processor, and file 319 is a document (file containing data representing text) capable of being opened by a word processor; however, these are merely presented as examples, it being possible for these files to, in general, be any type of file at all.

The linker 301 possesses two operational modes, network mode and local mode, between which it is capable of being switched by the user. In either mode, the linker 301 captures a symbol (typically a character string) in the same manner as was described above at the several embodiments. When network mode is selected, the linker 301, as was the case in the above embodiments, sends the aforesaid captured symbol to a URL server (reference number 5 at FIG. 1), receives a corresponding URL from the URL server, specifies that URL for use by a WWW browser 313 which it then launches, and the WWW browser 313 accesses the website at that URL. On the other hand, in local mode, the linker 301 looks to see whether the aforesaid captured symbol is contained in the text-action lookup table 305, and if a match is found, an action corresponding to that text is read therefrom, and a program for executing the task specified by that action is launched so as to cause execution of the action in question.

Moreover, independent of the network-local mode selection described above, the linker 301 can be set to a telephone mode. In this telephone mode, the linker 301, in the event that the aforesaid captured symbol is a text string, uses the telephone word lookup table 303 to determine whether that character string contains a known telephone number. If the character string contains such a telephone number, the linker 301 automatically extracts that telephone number from the character string and specifies that telephone number for use by a dialup application 311 which it then launches, and the dialup application 311 dials the telephone number in question.

Figure 12:
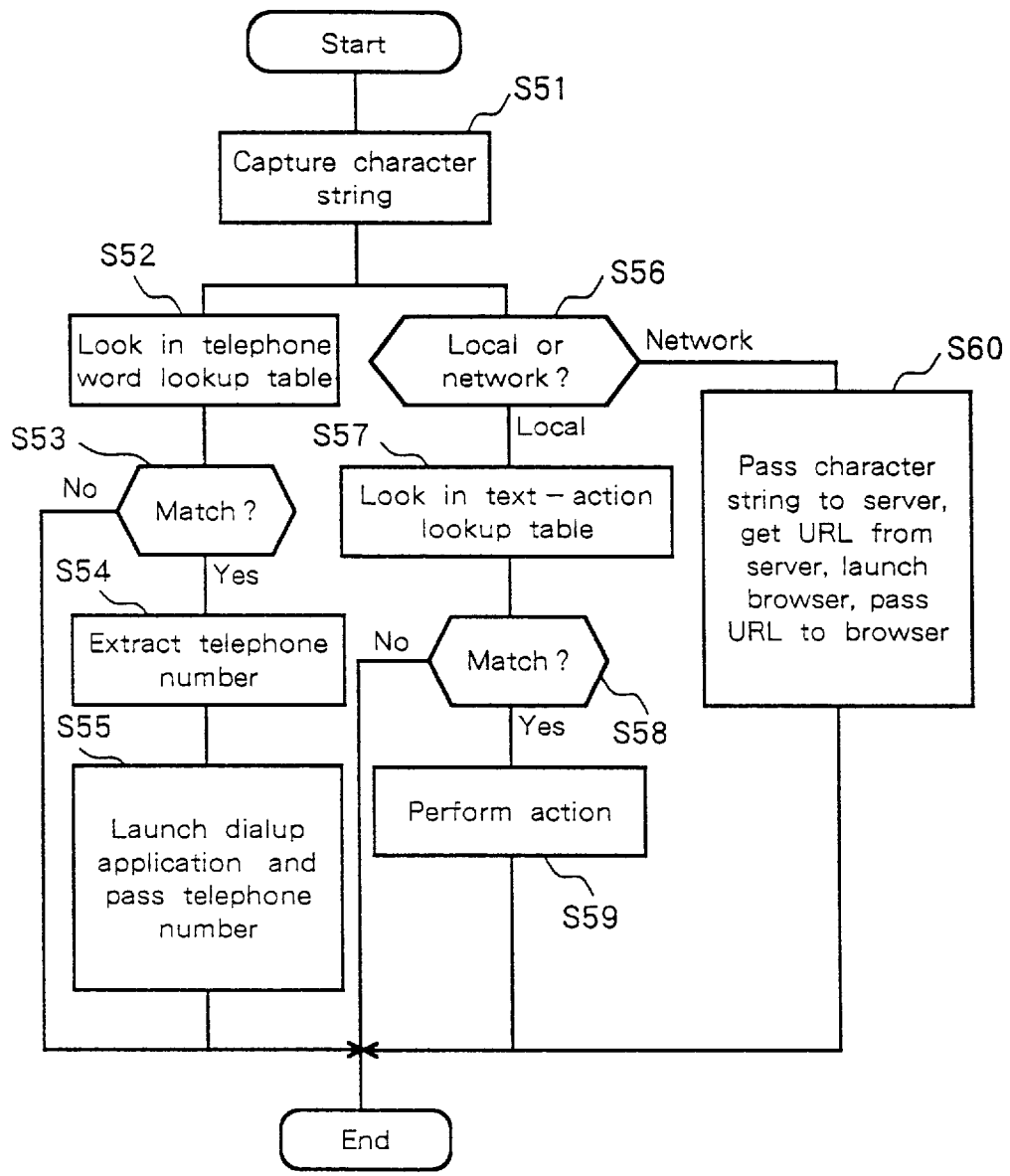
FIG. 12 is a flowchart showing processes occurring at a linker 301 when in telephone mode.

FIG. 12 is flowchart showing processes occurring at the linker 301 when in telephone mode.

Upon capturing a character string symbol (S51), the linker 301 compares that character string with each keyword in the telephone word lookup table 303 (S52). If the character string contains a word that matches any of the keywords ("Yes" at S53), this indicates that there is a high probability that the character string contains a telephone number. In such a case, the linker 301 extracts a telephone number from the character string (S54) and specifies that telephone number for use by a dialup application 311 which it then launches, and the telephone number in question is dialed (S55). It is also possible to omit steps S52 and S53 and proceed directly to step S54 from step S51.

In parallel with the aforementioned processing for dialing of the telephone number, the linker 301 also carries out the processing indicated at step S56 and thereafter. To wit, the linker 301, if set to local mode ("Local" at S56), compares the captured character string with text in the text-action lookup table 305 (S57). If the character string matches any text in the text-action lookup table 305 ("Yes" at S58), the linker 301 carries out processing for execution of the task specified by the action linked to the matched text in the text-action lookup table 305 (S59). For example, referring to the example shown in FIG. 11, if the matched text is "Sofmap", then because the action linked to the text "sofmap" is the URL "http:// . . . ", the linker 301 specifies the URL "http:// . . . " for use by a WWW browser 313 which it then launches, as a result of which the website at that URL is accessed. If the matched text is "cd", then because the action that is linked to the text "cd" is the executable program file "CDplayer.EXE" for playing an audio CD, the linker 301 launches CDplayer.EXE 315, as a result of which playing of audio CDs is permitted. If the matched text is "letter", then because the action linked to the text "letter" is the document file "LetterHead.DOC", which is capable of being opened by a word processor 317, the linker 301 specifies the document file "LetterHead.DOC" for use by the word processor 317 which it then launches, as a result of which the document file is opened. If the matched text is "Mary", then because the action linked to the text "Mary" is the telephone number "te1031234567", the linker 301 specifies the telephone number "031234567" for use by a dialup application 311 which it then launches, as a result of which that telephone number is dialed.

On the other hand, the linker 301, if set to network mode ("Network" at S56), sends the captured character string to a URL server, receives a corresponding URL from the URL server, and specifies that URL for use by a WWW browser 313 which it then launches (S60).

Figure 13:
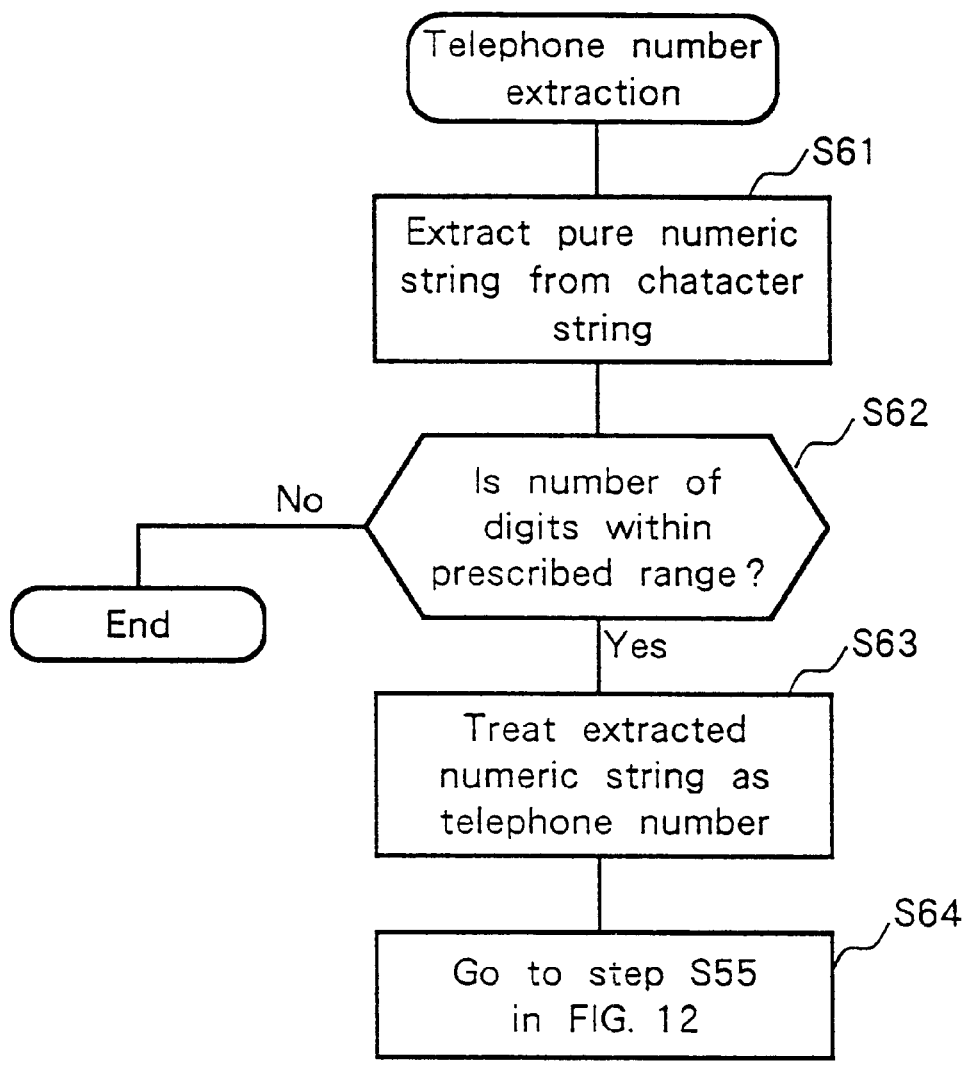
FIG. 13 is a flowchart showing a sequence of steps that might be used to extract a telephone number at step S54 of FIG. 12.

FIG. 13 shows a sequence of steps that might be used to extract a telephone number at step S54 of FIG. 12.

The linker 301 first extracts from the captured character string any pure or mixed numeric string, "mixed" here meaning that the initially extracted numeric string may in addition contain certain non-numeric formatting typical of telephone numbers. That is, the initially extracted numeric string may be a pure, continuous numeric string, such as "12345678", or it may contain certain non-numeric formatting typical of telephone numbers. Included among such non-numeric formatting typical of telephone numbers are, for example, hyphens which may be used to separate sets of numbers, such as is the case in "1-234-5678"; parentheses which may surround a portion of an otherwise numeric string, such as is the case with "1(234)5678"; and so forth. Regardless of whether the initially extracted numeric string contains, in addition, such non-numeric characters, a pure numeric string is subsequently extracted therefrom (S61). The linker 301 then counts the number of digits in the numeric string to determine whether the number of digits falls within a prescribed range recognized as suitable for a telephone number (S62). For example, a numeric string containing only one or two digits is probably too short, and a numeric string containing more than 20 digits is probably too long. Only if the number of digits contained in the numeric string falls within the prescribed range therefor does the linker 301 treat that numeric string as a telephone number (S63), and proceed to step S55 of FIG. 12, described above.

The above-described sequence of steps for extracting a telephone number is merely an example, there being a wide variety of conceivable algorithms according to which a telephone number may be extracted.

In the embodiments described above, where a linker handles a character string symbol, the character string is fundamentally represented by a character code. However, even when a character string is represented by a bitmapped font image or an outline font image, by employing pattern recognition (e.g., optical character recognition; hereinafter "OCR") art to convert that font image into a character code, it is possible for a linker to handle such a character string in the same manner as has been described in the above embodiments. For example, a user can use a region selecting tool in an image processing application to select a region corresponding to a desired character string from a text image scanned in using an image scanner or from a photographic image downloaded from a digital camera, and use the Control+C key sequence or a similar operation to pass the bitmapped image in the selected region to the linker. Alternatively, the linker may also be constituted such that after using the mouse to point to or select an arbitrary icon, tool, or the like displayed on the display screen and carrying out a prescribed linker operation, a bitmapped-image character string containing a bitmapped image of the icon, tool, or the like is passed to the linker. Upon receiving the character string image, the linker carries out pattern recognition (e.g., OCR) and okays (i.e., finalizes) selection of character code for each letter in the character string. After the character string image has thus been converted to a character code string, it is then possible for the linker to carry out processing for accessing a website at a URL corresponding to that character string, for dialing a telephone number contained within that character string, or for executing an action corresponding to that character string, as has already been described in the above embodiments.

Figure 14:
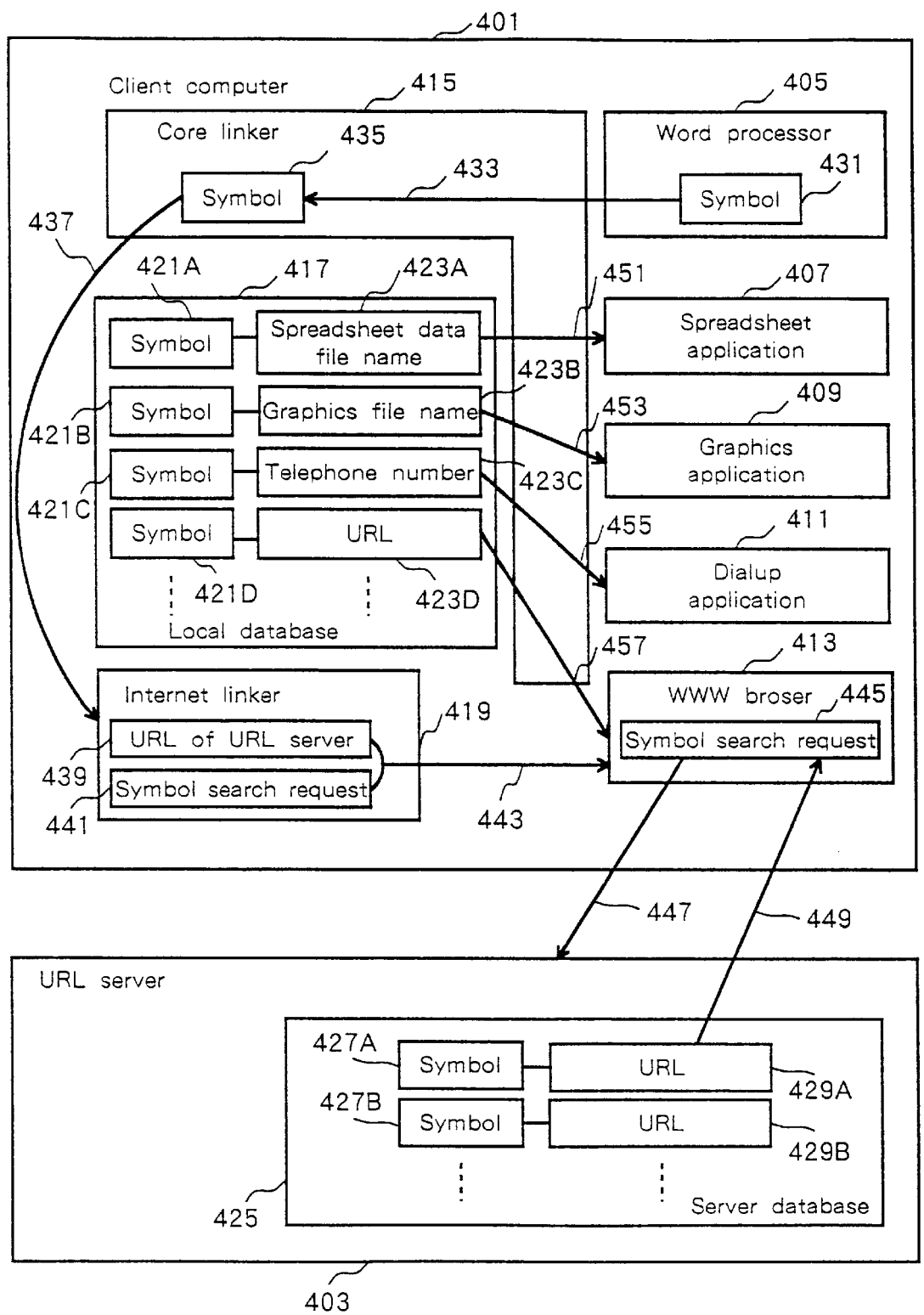
FIG. 14 is a block diagram showing yet another embodiment of a linker.

FIG. 14 shows yet another embodiment of a linker.

Figure 15:
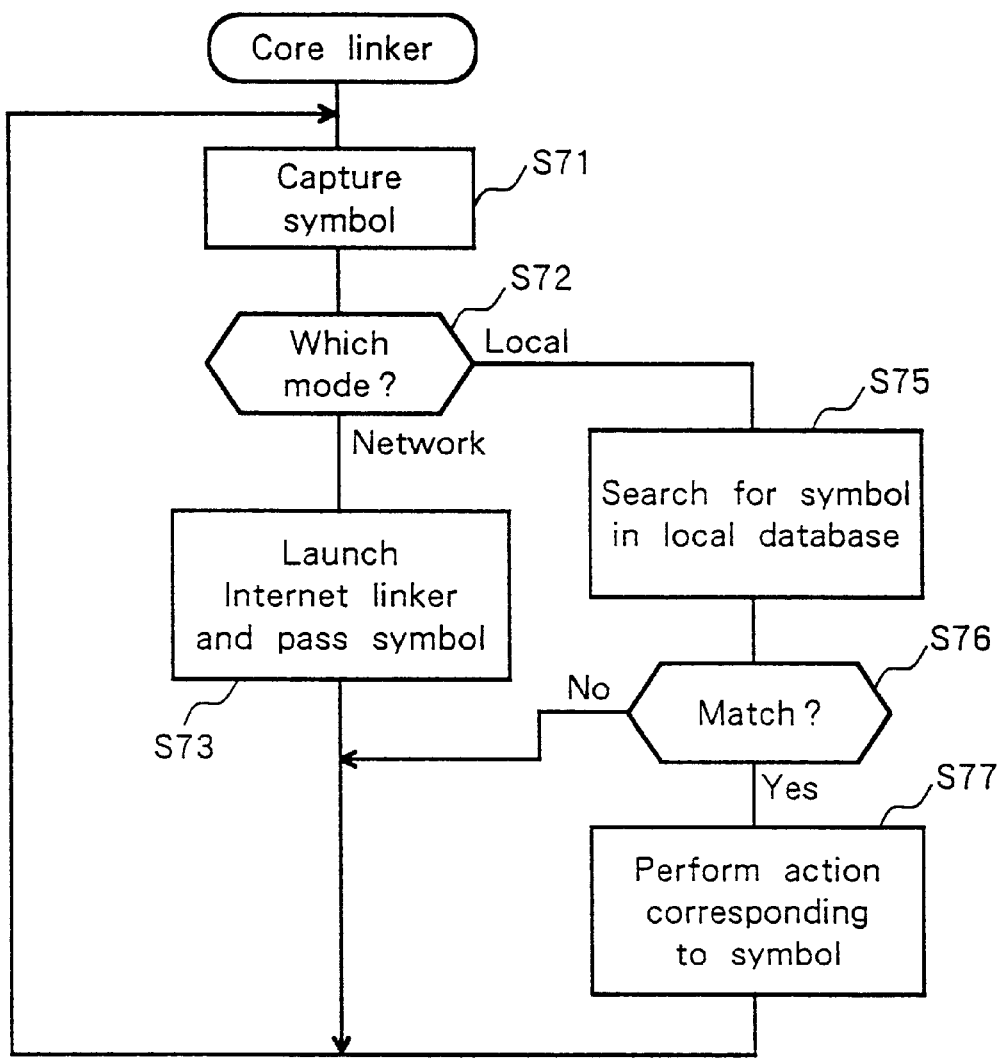
FIG. 15 is a flowchart showing operations carried out by a core linker.
Figure 16:
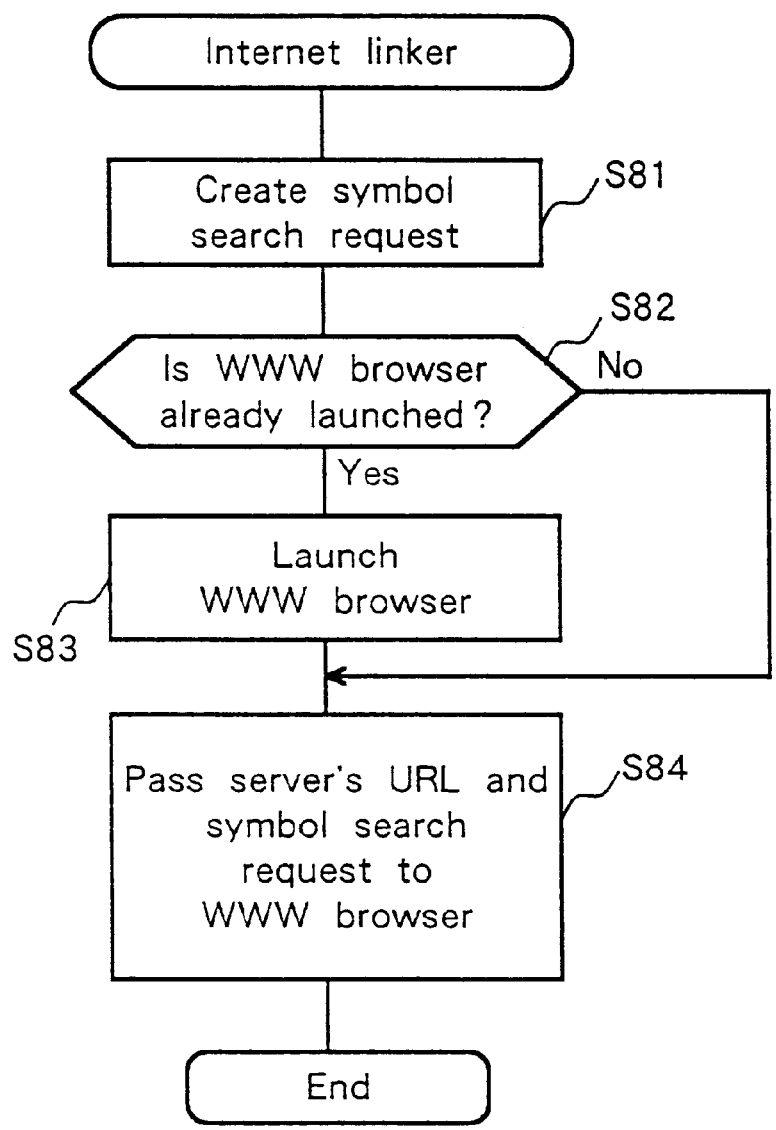
FIG. 16 is a flowchart showing operations carried out by an Internet linker.

A linker 401 on a client computer is constituted from two different program modules: a core linker 415 and an Internet linker 419. The core linker 415 may be a TSR-type program. FIG. 15 is a flowchart showing the sequence of operations carried out by the core linker 415, and FIG. 16 is a flowchart showing the sequence of operations carried out by the Internet linker 419.

Below, we describe operation of the core linker 415 and the Internet linker 419 with reference to FIG. 14 through FIG. 16.

The core linker 415 has two operational modes between which the user can choose, these being "network" and "local." In either mode, the core linker 415 employs a method, such as one of the various methods already described, to capture a symbol entered or selected by the user at an application on a client computer 401 (step S71 at FIG. 15). As an example, FIG. 14 shows a symbol 431 entered or selected by a user at a word processor 405 being captured by the core linker 415, as indicated by arrow 433. The operation that will next be carried out by the core linker 415 branches into two paths depending on the currently selected mode (S72). We will first describe the sequence of operations occurring in network mode.

In network mode, the core linker 415 launches the Internet linker 419, passing the captured symbol 435 thereto (S73 in FIG. 15), as indicated by arrow 437 in FIG. 14. The core linker 415 then goes into standby mode and awaits a new symbol. If the user enters or selects a new symbol, the core linker 415 captures the new symbol (S71 at FIG. 15), and then goes back and repeats the aforementioned operational sequence.

The Internet linker 419 is launched by the core linker 415 and receives the symbol from the core linker 415. The Internet linker 419 then creates a search request 441 requesting that a URL server 403 search its database 425 for that symbol (S81 at FIG. 16). The Internet linker 419 then launches a WWW browser 413 if one is not already launched on the client computer 401 (S82 and S83 at FIG. 16), and passes the URL 439 of the URL server 403, which has been previously registered therewith, and the aforesaid symbol search request 441 to this WWW browser 413 (S84 at FIG. 16), as indicated by arrow 443. Operation of the Internet linker 419 thereafter terminates.

The WWW browser 413 employs the URL of the URL server 403, which it received from the Internet linker 419, to access the URL server 403, and passes the symbol search request 445, which it received from the Internet linker 419, to the URL server 403, as indicated by arrow 447. The URL server 403 employs the symbol search request 445 which it has received to search the database 425 of the URL server 403 for the requested symbol, and if a match is found, reads from the database 425 the URL (or URLs) linked thereto (or the set comprising the symbol and the URL) and returns these to the WWW browser 413, as indicated by arrow 449. As a result, the WWW browser 413 accesses the website at the URL corresponding to the symbol in question.

We will next describe operations in local mode.

In local mode, upon capturing a symbol 435, the core linker 415 searches for the captured symbol 435 within a local database 417 previously prepared within a client computer 401 (S75 at FIG. 15). Within the local database 417 are various symbols 421A, 421B, 421C, 421D, . . . , and the various actions 423A, 423B, 423C, 423D, . . . linked thereto. Here, "action" refers to a task to be executed by the client computer when a certain symbol is specified by a user. For example, an action may be the name of a file (including the directory thereof) containing a program to be executed, the name of a data file (including the directory thereof) to be opened, a telephone number to be dialed, a URL to be accessed, an e-mail address to which e-mail is to be sent, and so forth. In the example shown at FIG. 14, the action linked to symbol 421A is the name of a certain file 423A that can be opened by a spreadsheet application 407, the action linked to symbol 421B is the name of a certain image file 423B, the action linked to symbol 421C is a certain telephone number 423C, and the action linked to symbol 421D is a certain URL 423D.

The core linker 415 searches the local database 417 for the captured symbol 435, and if a match is found ("Yes" at S76 in FIG. 15), reads from the local database 417 the action (or actions) linked to that symbol 435, and executes the task indicated by that action (S77 at FIG. 15). For example, in the example shown at FIG. 14, if a match to symbol 421A is found, a spreadsheet application 407 is launched, the name of the spreadsheet data file 423A is passed thereto, and that spreadsheet data file is opened, as indicated by arrow 451; if a match to symbol 421B is found, a graphics application 409 is launched, the name of the graphics file 423B is passed thereto, and that graphics file is opened, as indicated by arrow 453; if a match to symbol 421C is found, a dialup application 411 is launched, the telephone number 423C is passed thereto, and that telephone number is dialed, as indicated by arrow 455; and if a match to symbol 421D is found, a WWW browser 413 is launched, the URL 423D is passed thereto, and that website is accessed, as indicated by arrow 457.

Whereas the above embodiments possess the two operational modes "network" and "local," as a variation thereof it is also possible to have an embodiment wherein there is only one or the other of the two modes.

Whereas several embodiments of the present invention have, been described above, these embodiments are intended only for the purpose of example, it not being intended that the present invention should be construed as limited to these embodiments alone. Accordingly, the present invention may be carried out in the context of a wide variety of embodiments other than those specifically presented herein. For example, in addition to Internet URLs, it is possible to apply the present invention to a wide variety of other types of network locations and resources. Moreover, the URL server may exist locally within the client computer.

What is claimed is:

1. A system for specifying a location on a communications network for use by a network application installed in a computer, at least one of said network and said computer having a database that accumulates a plurality of sets of symbols and location information associated thereto, said system comprising:

a symbol capturer that captures a symbol arbitrarily specified by a user on a display of the man-machine interface of said computer;

a search request generator that generates a search request for a location information associated to said symbol which is captured by said symbol capturer; and a search request sender that sends said search request to said network application, thereby causing said network application to send said search request to said database and to receive from said database said location information associated to said symbol which is captured by said symbol capturer;

wherein:

said computer has a keyboard-type input apparatus including a conversion key and an okay key, and an input method editor that has a buffer for temporarily retaining a character or a character string which is entered from said keyboard-type input apparatus, that performs a conversion of said character or character string retained in said buffer in response to a user operation on said conversion key, and that transfers said character or character string retained in said buffer to an application being active on said display of said man-machine interface in response to a user operation on said okay key, said symbol capturer is able to capture a character or a character string retained in said buffer of said input method editor while an application other than said network application is active on said display of said man-machine interface.

2. A system for specifying a location on a communications network for use by a network application installed in a computer, at least one of said network and said computer having a database that accumulates a plurality of sets of symbols and location information associated thereto, said computer having:

a keyboard-type input apparatus including a conversion key and an okay key, and an input method editor that has a buffer for temporarily retaining a character or a character string which is entered from said keyboard-type input apparatus, that performs a conversion of said character or character string retained in said buffer in response to a user operation on said conversion key, and that transfers said character or character string retained in said buffer to an application being active on a display of the man-machine interface of said computer in response to a user operation on said okay key, said system comprising:

a character capturer that captures a character or a character string retained in said buffer of said input method editor while an application other than said network application is active on said display of said man-machine interface; and a search requester that generates a search request for a location information associated to said symbol captured by said character capturer, and that employs said search request so that said location information associated to said symbol captured is retrieved from said database and sent to said network application.

3. A system according to claim 2 wherein said search requester sends said search request to said database, receives said location information retrieved from said database, and sends said location information received to said network application.

4. A system according to claim 2 wherein said search requester sends said search request to said network application, thereby causing said network application to send said search request to said database and to receive said location information retrieved from said database.

5. A process carried out by a computer for specifying a location on a communications network for use by a network application installed in said computer, at least one of said network and said computer having a database that accumulates a plurality of sets of symbols and location information associated thereto, said computer having:

a keyboard-type input apparatus including a conversion key and an okay key, and an input method editor that has a buffer for temporarily retaining a character or a character string which is entered from said keyboard-type input apparatus, that performs a conversion of said character or character string retained in said buffer in response to a user operation on said conversion key, and that transfers said character or character string retained in said buffer to an application being active on a display of the man-machine interface of said computer in response to a user operation on said okay key, said process comprising the steps of:
- capturing a character or a character string retained in said buffer of said input method editor while an application other than said network application is active on said display of said man-machine interface;
- generating a search request for a location information associated to said symbol captured by said step of capturing; and
- employing said search request so that said location information associated to said, symbol captured is retrieved from said database and sent to said network application.

6. A computer-readable recording medium embodied within which there is a computer program for causing a computer to carry out a process for specifying a location on a communications network for use by a network application installed in said computer, at least one of said network and said computer having a database that accumulates a plurality of sets of symbols and location information associated thereto, said computer having:
- a keyboard-type input apparatus including a conversion key and an okay key, and
- an input method editor that has a buffer for temporarily retaining a character or a character string which is entered from said keyboard-type input apparatus, that performs a conversion of said character or character string retained in said buffer in response to a user operation on said conversion key, and that transfers said character or character string retained in said buffer to an application being active on a display of the man-machine interface of said computer in response to a user operation on said okay key, said computer program comprising:
- a program code segment for executing a step of capturing a character or a character string retained in said buffer of said input method editor while an application other than said network application is active on said display of said man-machine interface;
- a program code segment for executing a step of generating a search request for a location information associated to said symbol captured by said step of capturing; and
- a program code segment for executing a step of employing said search request so that said location information associated to said symbol captured is retrieved from said database and sent to said network application.

7. A system for specifying a location on a communications network for use by a network application installed in a computer, said computer having:
- a keyboard-type input apparatus including a conversion key and an okay key, and
- an input method editor that has a buffer for temporarily retaining a character or a character string which is entered from said keyboard-type input apparatus, that performs a conversion of said character or character string retained in said buffer in response to a user operation on said conversion key, and that transfers said character or character string retainedin said buffer to an application being active on a display of the man-machine interface of said computer in response to a user operation on said okay key, said system comprising:
- a character capturer that captures a character string retained in said buffer of said input method editor while an application other than said network application is active on said display of said man-machine interface;
- a location character string extractor that extracts a location character string representing a location on said network from said character string captured by said character capturer; and
- a location director that specifies said location character string for use by said network application, to cause said network application to execute communications involving said location represented by said location character string.

8. A system according to claim 7 wherein said communications network is a telephone network, said location character string is a telephone number, and said network application is an application for dialing a telephone.

9. A system according to claim 7 further comprising an action executioner that converts a character string captured by said character capturer into action information previously associated to said character string captured, and that executes an action according to said action information.

10. A system according to claim 9 wherein said action executioner has a database that accumulates a plurality of sets of character strings and action information associated thereto, and acquires from said database said action information associated to said character string captured.

11. A system according to claim 9 wherein:
- said network has a database that accumulates a plurality of sets of character strings and action information associated thereto; and
- said action executioner issues to said database a search request for said location information associated to said character string captured, and receives from said database said action information associated to said character string captured.

12. A process carried out by a computer for specifying a location on a communications network for use by a network application installed in said computer, said computer having:
- a keyboard-type input apparatus including a conversion key and an okay key, and
- an input method editor that has a buffer for temporarily retaining a character or a character string which is entered from said keyboard-type input apparatus, that performs a conversion of said character or character string retained in said buffer in response to a user operation on said conversion key, and that transfers said character or character string retained in said buffer to an application being active on a display of the man-machine interface of said computer in response to a user operation on said okay key, said process comprising the steps of:
- capturing a character string retained in said buffer of said input method editor while an application other than said network application is active on said display of said man-machine interface;
- extracting a location character string representing a location on said network from said character string captured by said step of capturing; and
- specifying said location character string for use by said network application, to cause said network application to execute communications involving said location represented by said location character string.

13. A computer-readable recording medium on which there is recorded a computer program for causing a computer to execute a process for specifying a location on a communications network for use by a network application installed in said computer, said computer having:

a keyboard-type input apparatus including a conversion key and an okay key, and an input method editor that has a buffer for temporarily retaining a character or a character string which is entered from said keyboard-type input apparatus, that performs a conversion of said character or character string retained in said buffer in response to a user operation on said conversion key, and that transfers said character or character string retained in said buffer to an application being active on a display of the man-machine interface of said computer in response to a user operation on said okay key, said computer program comprising:

a program code segment for executing a step of capturing a character string retained in said buffer of said input method editor while an application other than said network application is active on said display of said man-machine interface;

a program code segment for executing a step of extracting a location character string representing a location on said network from said character string captured by said step of capturing; and a program code segment for executing a step of specifying said location character string for use by said network application, to cause said network application to execute communications involving said location represented by said location character string.

* * * * *